United States Patent
Hirata et al.

(10) Patent No.: US 12,541,091 B2
(45) Date of Patent: Feb. 3, 2026

(54) MEMS MIRROR DEVICE AND DISTANCE MEASURING APPARATUS

(71) Applicant: Mitsubishi Electric Corporation, Tokyo (JP)

(72) Inventors: Yoshiaki Hirata, Tokyo (JP); Nobuaki Konno, Tokyo (JP); Yoshitaka Kajiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 348 days.

(21) Appl. No.: 18/272,101

(22) PCT Filed: Jan. 28, 2021

(86) PCT No.: PCT/JP2021/003019
§ 371 (c)(1),
(2) Date: Jul. 13, 2023

(87) PCT Pub. No.: WO2022/162828
PCT Pub. Date: Aug. 4, 2022

(65) Prior Publication Data
US 2024/0142770 A1    May 2, 2024

(51) Int. Cl.
G02B 26/08    (2006.01)
B81B 3/00    (2006.01)
G02B 26/10    (2006.01)

(52) U.S. Cl.
CPC ........ *G02B 26/0858* (2013.01); *B81B 3/0045* (2013.01); *G02B 26/101* (2013.01); *B81B 2201/042* (2013.01); *B81B 2203/0172* (2013.01)

(58) Field of Classification Search
CPC .............. G02B 26/0858; G02B 26/101; G02B 26/0833; B81B 3/0045; B81B 2201/042; B81B 2203/0172; B81B 2203/0154; B81B 2203/058; B81B 2207/07; G01S 7/4817

See application file for complete search history.

(56) References Cited

U.S. PATENT DOCUMENTS

| | | | |
|---|---|---|---|
| 5,606,447 A | 2/1997 | Asada et al. | |
| 2016/0172951 A1* | 6/2016 | Takimoto | H02K 33/18 310/37 |

FOREIGN PATENT DOCUMENTS

| | | |
|---|---|---|
| DE | 102015217938 A1 | 3/2017 |
| JP | 2722314 B2 | 3/1998 |
| JP | 2003-270555 A | 9/2003 |
| JP | 2008242207 A | 10/2008 |

(Continued)

OTHER PUBLICATIONS

International Search Report and Written Opinion mailed on Apr. 20, 2021, received for PCT Application PCT/JP2021/003019, filed on Jan. 28, 2021, 8 pages including English Translation.

(Continued)

*Primary Examiner* — Euncha P Cherry
(74) *Attorney, Agent, or Firm* — XSENSUS LLP

(57) ABSTRACT

The MEMS mirror device includes a fixed member, a movable member rotatably coupled to the fixed member, a mirror, and a wire. The movable member includes a movable plate, a twist beam, and a meander beam. The meander beam is arranged along the twist beam. The mirror is formed on the movable plate. The wire extends from the movable plate to the fixed member. The wire is formed on the meander beam.

18 Claims, 28 Drawing Sheets

(56) References Cited

FOREIGN PATENT DOCUMENTS

| JP | 2018-151496 A | 9/2018 |
| JP | 2019184858 A | 10/2019 |
| WO | 2007016111 A2 | 2/2007 |
| WO | 2011095231 A1 | 8/2011 |

OTHER PUBLICATIONS

Office Action mailed Oct. 2, 2025 in counterpart German Patent Application No. 11 2021 006 975.6.

* cited by examiner

MEMS MIRROR DEVICE AND DISTANCE MEASURING APPARATUS

CROSS-REFERENCE TO RELATED APPLICATION

The present application is based on PCT filing PCT/JP2021/003019, filed Jan. 28, 2021, the entire contents of which are incorporated herein by reference.

TECHNICAL FIELD

The present disclosure relates to a MEMS mirror device and a distance measuring apparatus.

Japanese Patent Laying-Open No. 2003-270555 (PTL 1) discloses an optical scanning device equipped with a planar actuator. This optical scanning device includes a fixed member, an outer torsion bar, an outer movable plate, an inner torsion bar, an inner movable plate, a reflection mirror, an outer drive coil, a first electrode terminal, an inner drive coil, a second electrode terminal, a first wire, and a second wire. The outer movable plate is connected to the fixed member via the outer torsion bar. The inner movable plate is connected to the outer movable plate via the inner 5 torsion bar. The reflection mirror and the inner drive coil are disposed on the inner movable plate. The outer drive coil is formed on the outer movable plate. The first electrode terminal and the second electrode terminal are formed on the fixed member.

The outer drive coil is connected to the first electrode terminal via the first wire. The inner drive coil is connected to the second electrode terminal via the second wire. The first wire is formed on the outer torsion bar. The first wire formed on the outer torsion bar extends in the longitudinal direction of the outer torsion bar. The second wire is formed on both the inner torsion bar and the outer torsion bar. The second wire formed on the inner torsion bar extends in the longitudinal direction of the inner torsion bar, and the second wire formed on the outer torsion bar extends in the longitudinal direction of the outer torsion bar.

CITATION LIST

Patent Literature

PTL 1: Japanese Patent Laying-Open No. 2003-270555

SUMMARY OF INVENTION

Technical Problem

However, in the optical scanning device disclosed in PTL 1, all of the wires (the first wire and the second wire) are formed on the torsion bar (the outer torsion bar and the inner torsion bar). Therefore, it is necessary to increase the width of the torsion bar. If the width of the torsion bar is increased, the optical scanning angle of the optical scanning device will become smaller. The present disclosure has been accomplished in view of the aforementioned problem, and it is therefore an object of the present disclosure to provide a MEMS mirror device and a distance measuring apparatus having a larger optical scanning angle.

Solution to Problem

The MEMS mirror device of the present disclosure includes a fixed member, a movable member rotatably coupled to the fixed member, a mirror, and at least one first wire. The movable member includes a movable plate having a front surface, at least one first twist beam connected to the movable plate, and at least one first meander beam connected to the movable plate. The longitudinal direction of the at least one first twist beam is in a first direction. The at least one first meander beam is disposed along the at least one first twist beam. The mirror is formed on the front surface of the movable plate. The at least one first wire extends from the movable plate to the faxed member. The at least one first wire is formed on the at least one first meander beam.

The distance measuring apparatus of the present disclosure includes the MEMS mirror device of the present disclosure.

Advantageous Effects of Invention

Therefore, the MEMS mirror device and the distance measuring apparatus of the present disclosure each has a larger optical scanning angle.

BRIEF DESCRIPTION OF DRAWINGS

FIG. 5 is a schematic cross-sectional view taken along a line V-V illustrated in.

FIG. 2 for illustrating the MEMS mirror device of the first embodiment;

DESCRIPTION OF EMBODIMENTS

Figure 1:
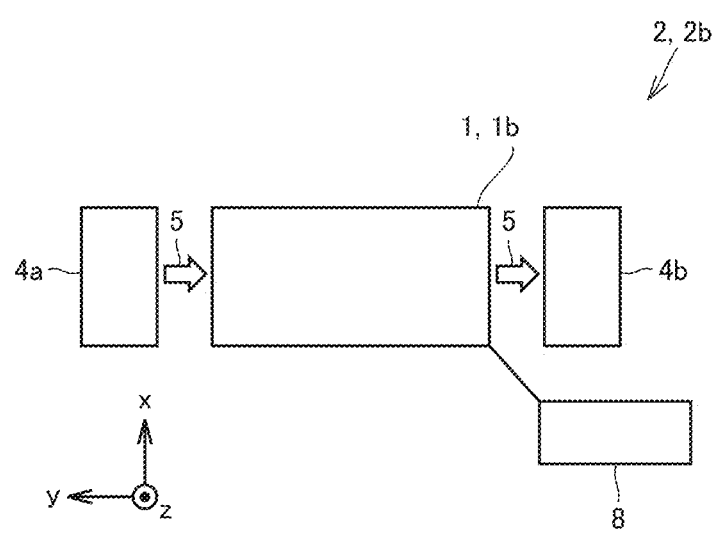
FIG. 1 is a schematic view illustrating an optical scanning device according to a first embodiment and a second embodiment.

Hereinafter, embodiments of the present disclosure will be described. The same components are denoted by the same reference numerals, and the description thereof will not be repeated.

First Embodiment

With reference to FIG. 1, an optical scanning device 2 according to a first embodiment will be described. The optical scanning device 2 scans light (for example laser light) incident on the optical scanning device 2. The optical scanning device 2 is applied to, for example, an image forming device or a laser distance measuring apparatus. The optical scanning device 2 includes a MEMS (Micro Electro Mechanical System) mirror device 1, a magnetic field generator 4a, a magnetic field generator 4b, and a controller 8.

The magnetic field generators 4a and 4b are configured to apply a magnetic field 5 to the MEMS mirror device 1 in a second direction (y direction). The magnetic field generators 4a and 4b are, for example, permanent magnets.

With reference to FIGS. 2 to 11, the MEMS mirror device 1 will be described. The MEMS mirror device 1 mainly includes a fixed member 10, a movable member, a mirror 12, a first coil 20, a strain gauge 23, a strain gauge 24, a temperature sensor 28, terminals 30a, 30b, 33a, 33b, 34a, 34b, 38a and 38b, and wires 40a, 40b, 43a, 43b, 43c, 44a, 44b, 44c, 48a and 48b.

Figure 5:
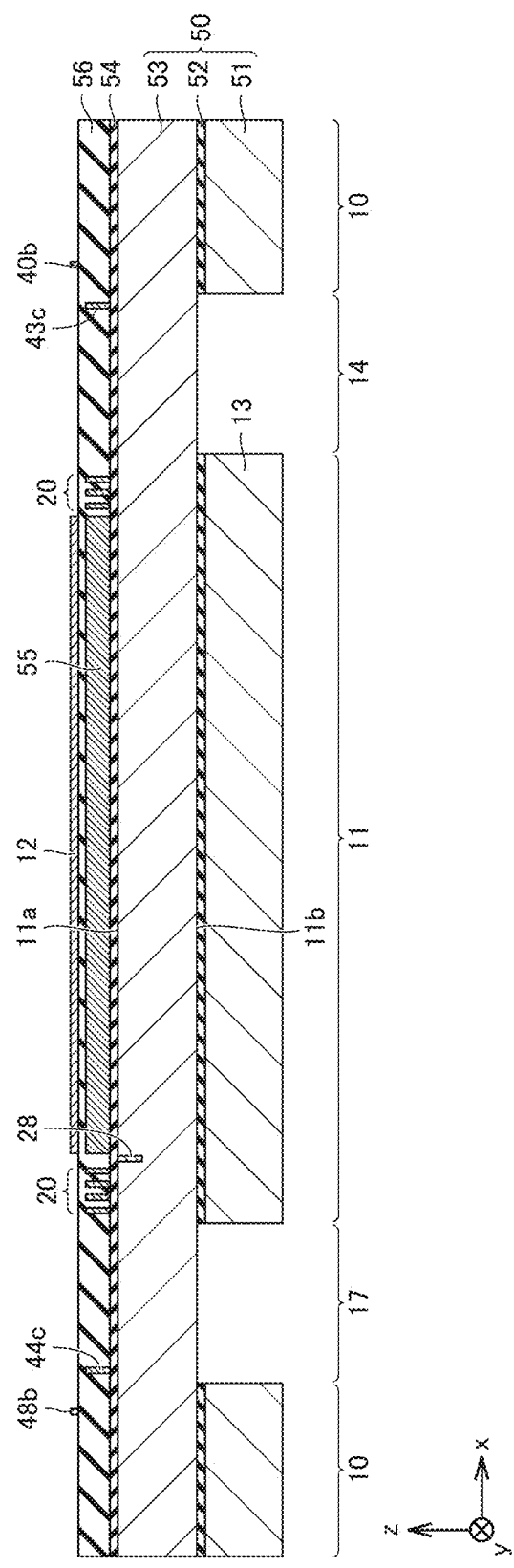
Figure 6:
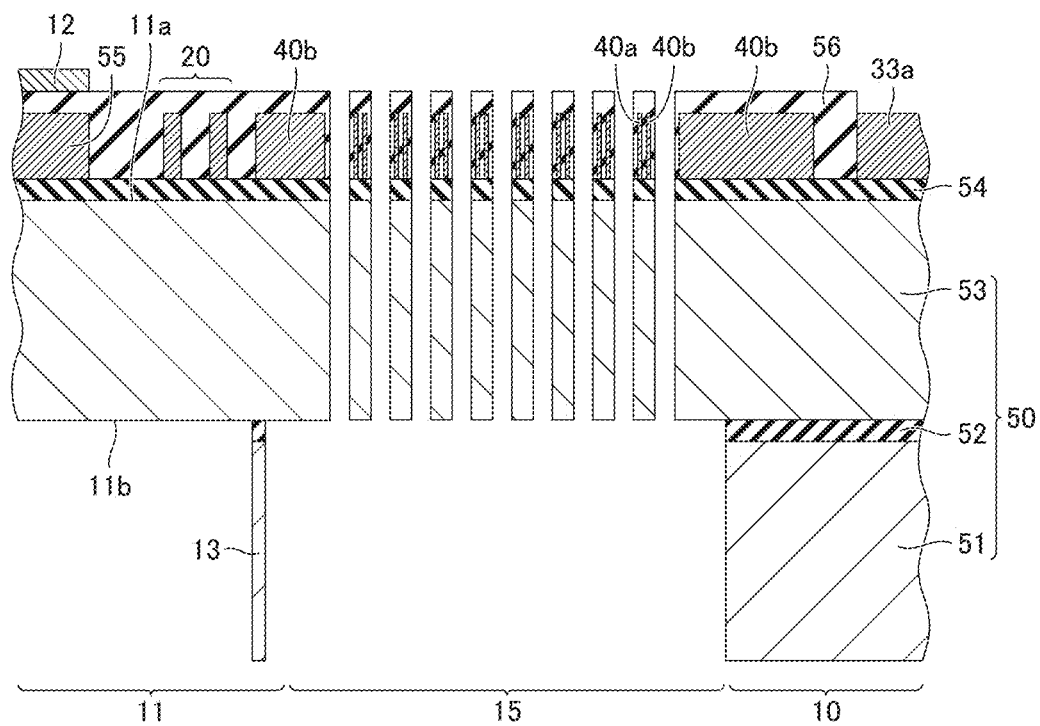
FIG. 6 is a schematic enlarged cross-sectional view taken along a line VI-VI illustrated in FIG. 3 for illustrating the MEMS mirror device of the first embodiment.
Figure 7:
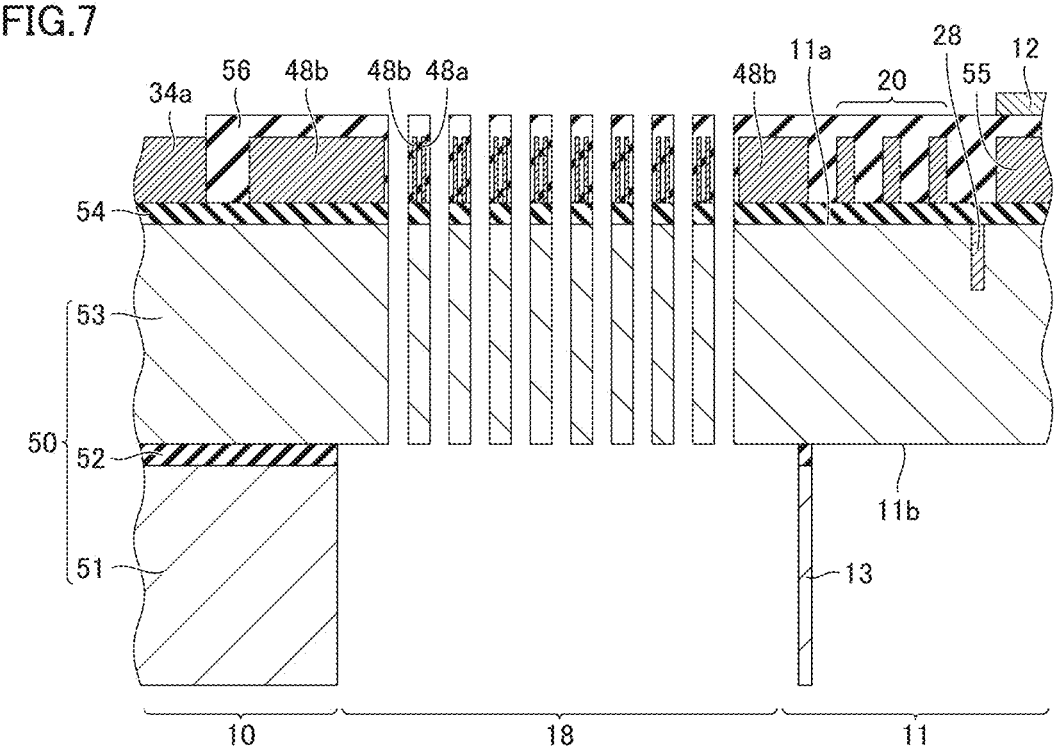
FIG. 7 is a schematic enlarged cross-sectional view taken along a line VII-VII illustrated in FIG. 4 for illustrating the MEMS mirror device of the first embodiment.
Figure 8:
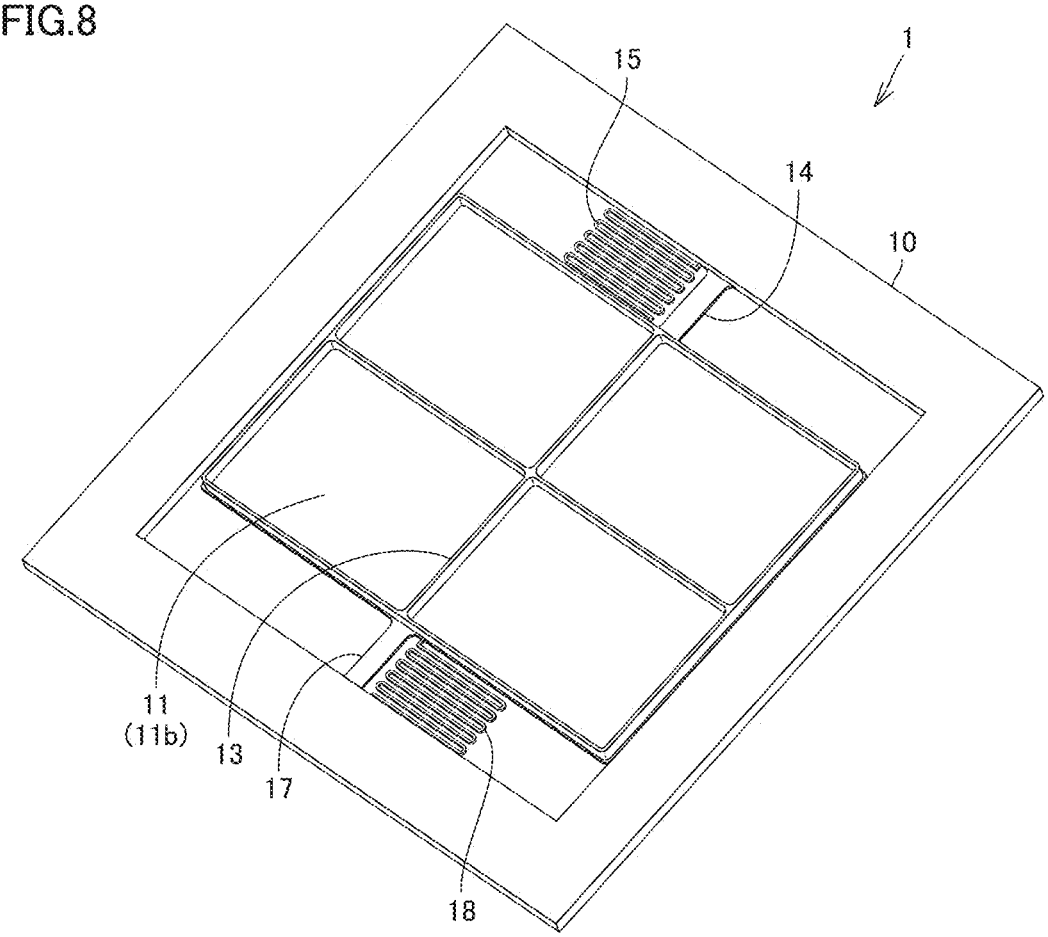
FIG. 8 is a schematic rear perspective view illustrating the MEMS mirror device according to the first embodiment.
Figure 9:
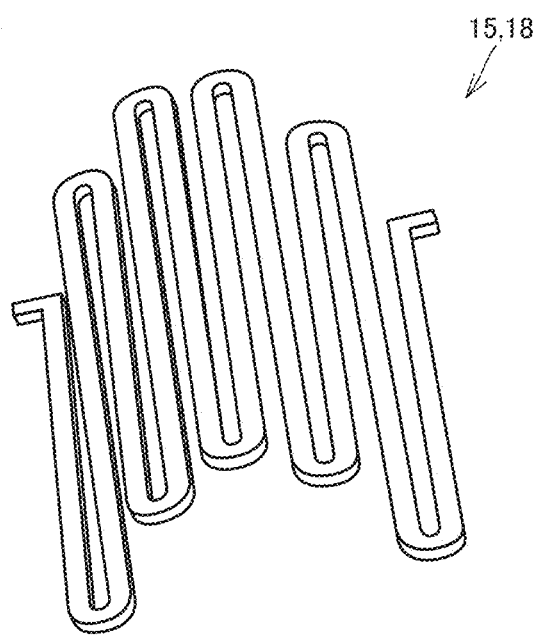
FIG. 9 is a schematic enlarged perspective view illustrating a natural vibration mode of a meander beam.

The fixed member 10 supports the movable member. The fixed member 10 is, for example, a fixed frame. With reference to FIGS. 5 to 7, the fixed member 10 includes, for example, an SOI (silicon on insulator) substrate 50, Specifically, the SOI substrate 50 includes a Si support layer 51, an insulating layer 52, and a Si layer 53. The insulating layer 52 is formed on the Si support layer 51. The insulating layer 52 is, for example, a $SiO_2$ layer. The Si layer 53 is formed on the insulating layer 52. An insulating layer 54 and an insulating layer 56 may be formed on the fixed member 10. The insulating layer 54 is thrilled on the Si layer 53. The insulating layer 54 is, for example, a $SiO_2$ layer. The insulating layer 56 is formed on the insulating layer 54. The insulating layer 56 is, for example, an inorganic insulating layer such as a $SiO_2$ layer or an organic insulating layer.

The movable member is rotatably coupled to the fixed member 10. The movable member is disposed, for example, inside the fixed frame. The movable member includes a movable plate 11, a twist beam 14, a twist beam 17, a meander beam 15, and a meander beam 18. The movable member may further include ribs 13.

The movable plate 11 includes a front surface 11a, a rear surface 11b opposite to the front surface 11a, a first side surface 11e, and a second side surface 11f opposite to the first side surface 11e. When the twist beams 14 and 17 are not twisted, each of the front surface 11a and the rear surface 11b of the movable plate 11 extends in a first direction (x direction) and a second direction (y direction) intersecting the first direction (x direction). Specifically, the first direction (x direction) is perpendicular to the second direction (y direction). In a plan view of the front surface 11a of the movable plate 11, the movable plate 11 has a center 11c. Each of the first side surface ne and the second side surface 11f is connected to the front surface 11a and the rear surface 11b. Each of the first side surface 11e and the second side surface 11f of the movable plate 11 may extend along the longitudinal direction of the movable plate 11, and may be a longitudinal side surface of the movable plate 11. With reference to FIGS. 5 to 7, the movable plate 11 includes, for example, a Si layer 53.

With reference to FIGS. 5 to 8, the ribs 13 are formed on the rear surface 11b of the movable plate 11. The ribs 13 increase the rigidity of the movable plate 11 so as to prevent the movable plate 11 from being distorted when the movable plate 11 is rotated about the twist beams 14 and 17. Each rib 13 includes, for example, a Si support layer 51 and an insulating layer 52.

Figure 10:
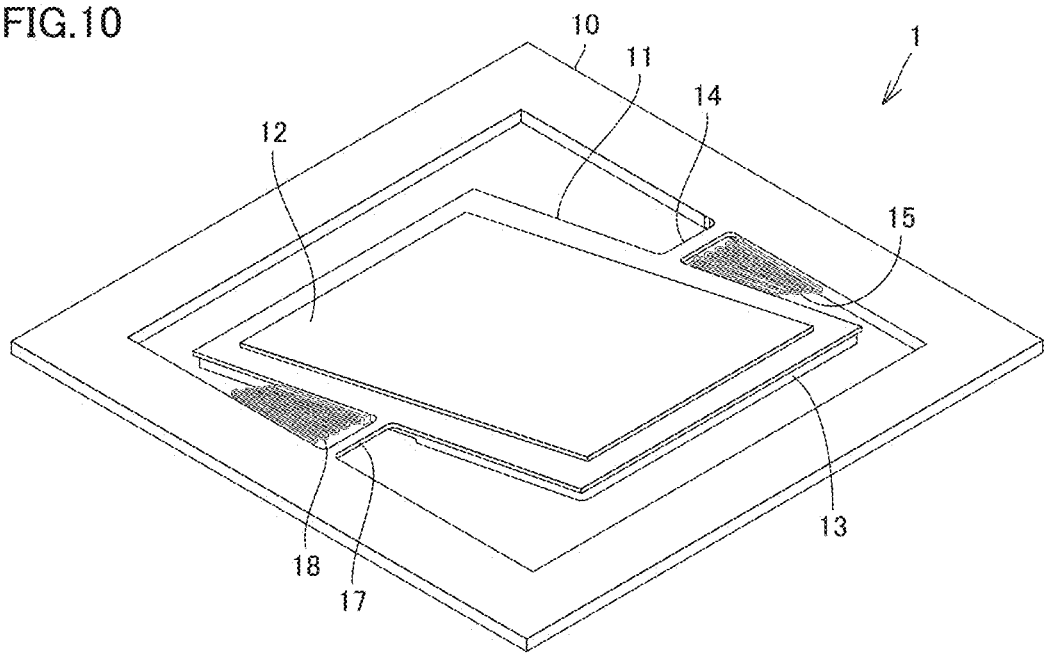
FIG. 10 is a schematic front perspective view illustrating the MEMS mirror device of the first embodiment in an operating state.

With reference to FIGS. 2 to 4 and FIGS. 6 to 8, the twist beams 14 and 17 are connected to the movable plate 11. In the present embodiment, the twist beams 14 and 17 are also connected to the fixed member 10. The longitudinal direction of the twist beams 14 and 17 is in the first direction (x direction). As illustrated in FIG. 10, the movable plate 11 is rotatable about the twist beams 14 and 17 (x axis). With reference to FIG. 5, each of the twist beams 14 and 17 includes the Si layer 53. The insulating layer 54 and the insulating layer 56 may be formed on each of the twist beams 14 and 17.

The meander beams 15 and 18 are connected to the movable plate 11. The meander beam 15 and the twist beam 14 are connected to the same surface (specifically, the first side surface 11e) of the movable plate 11. The meander beam is disposed along the twist beam 14. The meander beam 18 and the twist beam 17 are connected to the same surface (specifically, the second side surface 11O of the movable plate 11. The meander beam 18 is disposed along the twist beam 17. In the present embodiment, the meander beams 15 and 18 are connected to the fixed member 10.

The meander beams 15 and 18 may be disposed at a position where a stress applied to the meander beams 15 and 18 is low when the movable plate 11 is rotated and a stress applied from the twist beams 14 and 17 to the meander beams 15 and 18 is low when the twist beams 14 and 17 are twisted. The meander beam 15 is disposed on a first side (−y side) of the twist beam 14. The meander beam 18 is disposed on a second side (+y side) of the twist beam 17. The second side is opposite to the first side. Specifically, in a plan view of the front surface 11a of the movable plate 11, the meander beams 15 and 18 are disposed rotationally symmetrically with respect to the center 11c of the movable plate 11.

The folding direction of the meander beams 15 and 18 is in the second direction (y direction). The folding direction of the meander beams 15 and 18 may be in the first direction (x direction). With reference to FIGS. 6 and 7, each of the meander beams 15 and 18 includes the Si layer 53. The insulating layer 54 and the insulating layer 56 may be formed on each of the meander beams 15 and 18. The twist beams 14 and 17 may have the same layer structure as the meander beams 15 and 18.

The natural vibration frequency of each of the meander beams 15 and 18 when both ends of each of the meander beams 15 and 18 are fixed is larger than the resonance frequency of a rotational motion of the movable member about the twist beams 14 and 17. The natural vibration frequency of each of the meander beams 15 and 18 refers to the natural vibration frequency of each of the meander beams 15 and 18 in the primary natural vibration mode (see FIG. 9) when both ends of each of the meander beams 15 and 18 are fixed. Therefore, the meander beams 15 and 18 smoothly follow the rotational motion of the movable plate 11 about the twist beams 14 and 17 without hindering the rotational motion of the movable plate 11.

The rigidity of the meander beams 15 and 18 is lower than that of the twist beams 14 and 17. The rigidity of the meander beams 15 and 18 may be defined by, for example, the length, the width and the number of meander times of the meander beams 15 and 18, and the distance between adjacent beam portions of the meander beams 15 and 18, and the like.

Figure 11:
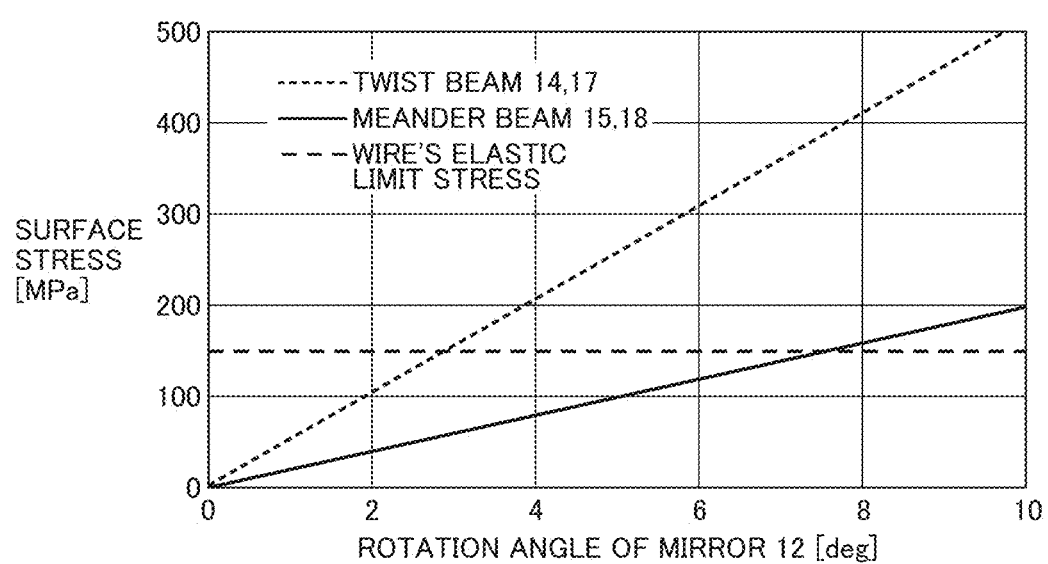
FIG. 11 is a graph illustrating a relationship between a rotation angle of a mirror and a stress generated on surfaces of a twist beam and a meander beam.

Thus, with reference to FIG. 11, it is possible to reduce the stress generated on the surface of the meander beams 15 and 18 lower than the stress generated on the surface of the twist beams 14 and 17 when the mirror 12 (the movable plate 11) is rotated to twist the twist beams 14 and 17 and the meander beams 15 and 18.

Thereby, it is possible to reduce the stress applied to the wires formed on the surface of the meander beams 15 and 18 lower than the stress applied to the wires formed on the surface of the twist beams 14 and 17. Accordingly, during the operation of the MEMS mirror device 1, it is difficult for the wires (for example, the wires 40a, 40b, 48a and 48b) to deteriorate or break. Thereby, the reliability of the MEMS mirror device 1 is improved.

Further, it is possible to increase a rotation angle of the mirror 12 (the movable plate 11) when a stress applied to the wire reaches an elastic limit stress of the wire. For example, with reference to FIG. 11, when an aluminum wire is formed on the surface of the twist beams 14 and 17 made of Si, the stress applied to the aluminum wire reaches an elastic limit stress of the aluminum wire when the rotation angle of the mirror 12 (the movable plate 11) is 2.9°. On the other hand, when an aluminum wire is formed on the surface of the meander beams 15 and 18 made of Si, the stress applied to the aluminum wire reaches the elastic limit stress of the aluminum wire when the rotation angle of the mirror 12 (the movable plate 11) is 7.6°. Thus, it is possible to increase the optical scanning angle of the MEMS mirror device 1.

With reference to FIGS. 2 to 7 and 10, the mirror 12 is formed of a material having a high reflectivity such as gold, silver, or aluminum. The mirror 12 is formed on the front surface 11a of the movable plate 11. Specifically, the mirror 12 is formed on the front surface 11a of the movable plate 11 with the insulating layer 54, the metal layer 55 and the insulating layer 56 interposed therebetween. The metal layer 55 may be formed of the same material as the first coil 20 and each of the wires 40a, 40b, 43a, 43b, 43c, 44a, 44b, 44c, 48a and 48b. When the twist beams 14 and 17 are not twisted, the reflection surface of the mirror 12 extends in the first direction (x direction) and the second direction (y direction). In a plan view of the front surface 11a of the movable plate 11, for example, the center of the mirror 12 coincides with the center 11c of the movable plate 11. An underlying layer (not shown) such as a Cr film may be formed between the mirror 12 and the insulating layer 56. The underlying layer improves adhesion between the mirror 12 and the insulating layer 56.

With reference to FIGS. 2 to 7, the first coil 20 is, for example, a thin-film coil. The first coil 20 is formed of a metal layer such as aluminum, gold, silver, or copper. The first coil 20 is disposed on the movable plate 11, for example. Specifically, the first coil 20 is formed on the front surface 11a of the movable plate 11 with the insulating layer 54 interposed therebetween. The insulating layer 54 electrically insulates the first coil 20 from the Si layer 53. In a plan view of the front surface 11a of the movable plate 11, for example, the first coil 20 is formed around the mirror 12. The first coil 20 may be covered with the insulating layer 56.

Figure 2:
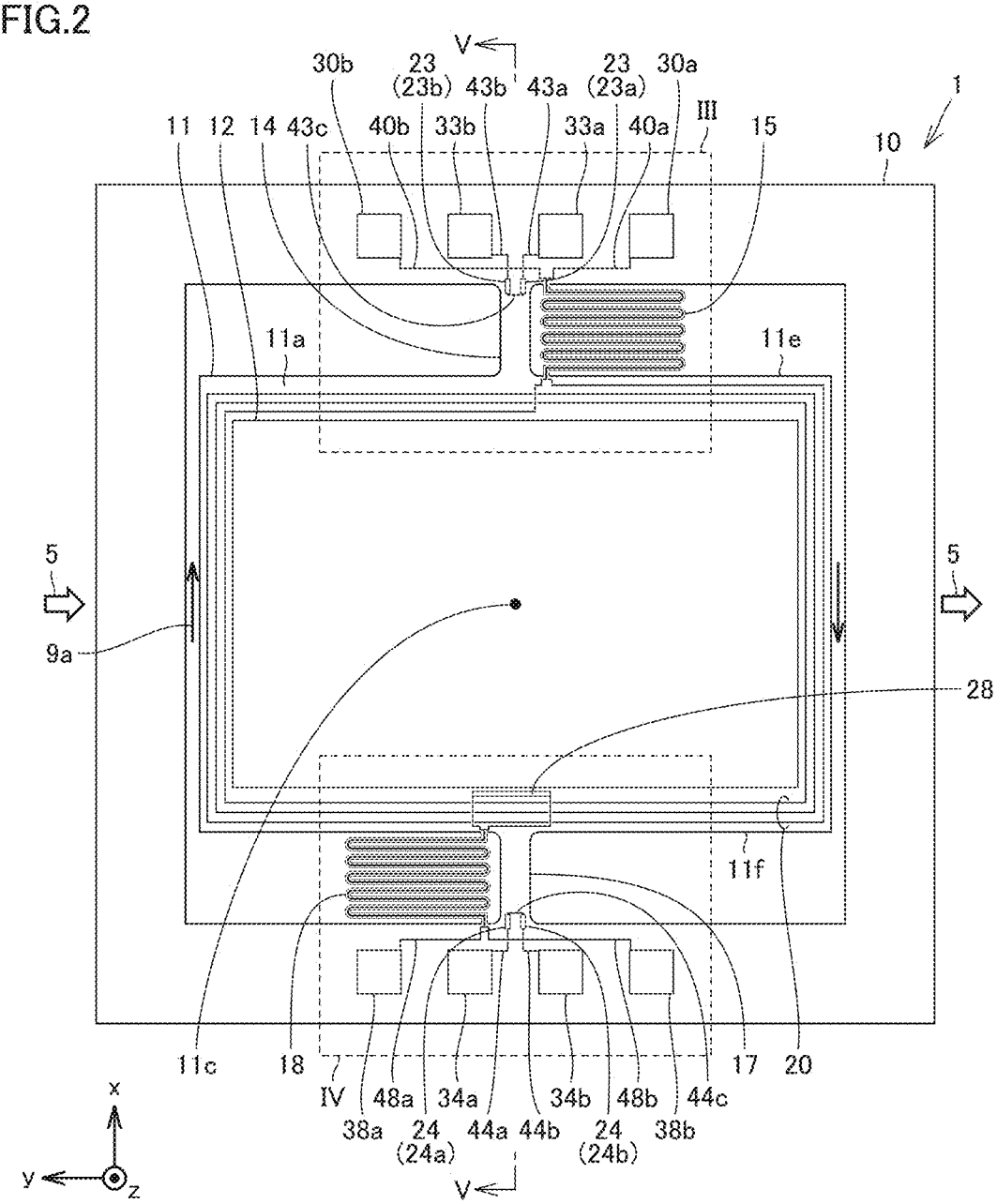
FIG. 2 is a schematic front view illustrating a MEMS mirror device according to the first embodiment.
Figure 3:
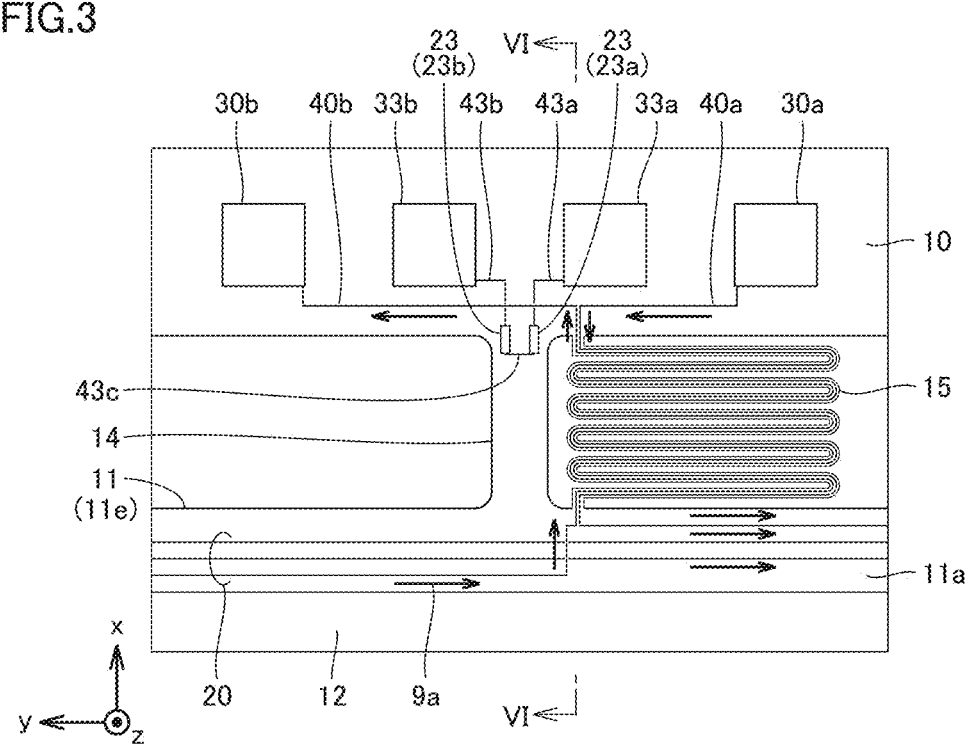
FIG. 3 is a schematic enlarged front view illustrating a region III illustrated in FIG. 2 of the MEMS mirror device according to the first embodiment.
Figure 4:
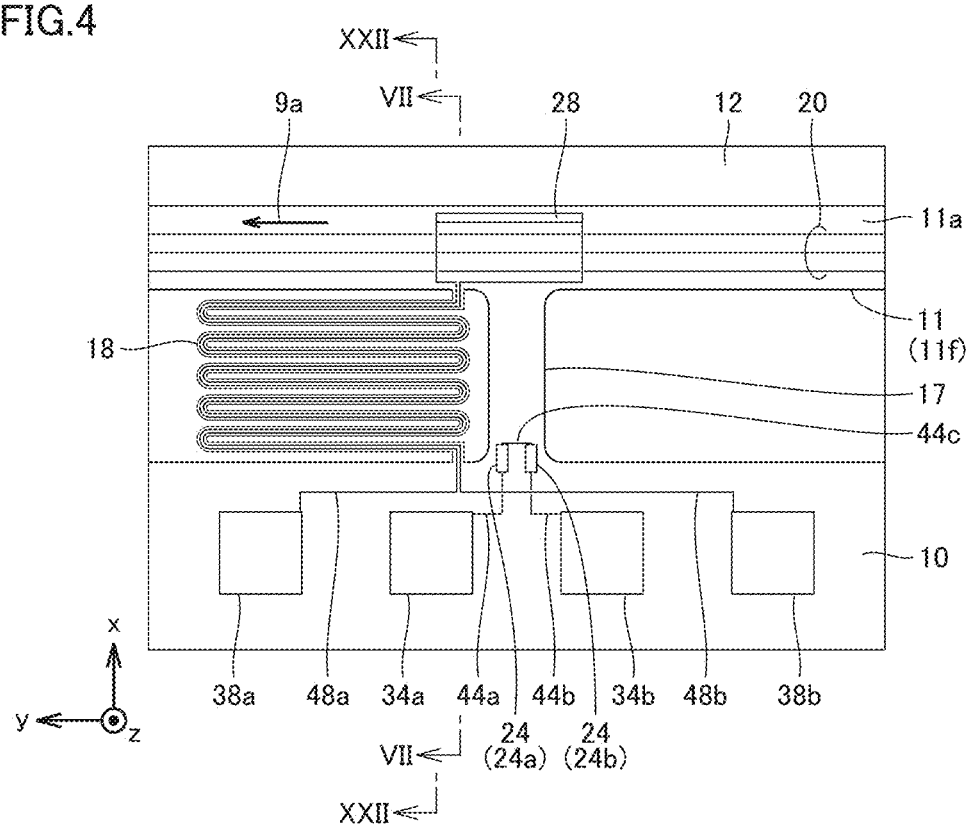
FIG. 4 is a schematic enlarged front view illustrating a region IV illustrated in FIG. 2 of the MEMS mirror device according to the first embodiment.

With reference to FIGS. 2 to 4, the strain gauges 23 and 24 detect a twist angle of the twist beams 14 and 17, i.e., a rotation angle $\theta_x$ of the mirror 12 (the movable plate 11) about the twist beams 14 and 17 (x axis). The strain gauges 23 and 24 are disposed, for example, at a portion of the twist beams 14 and 17 that is distal to the movable plate 11. The strain gauges 23 and 24 are disposed at a portion of the twist beams 14 and 17 that is proximal to the fixed member 10 or at a portion of the fixed member 10 that is proximal to the twist beams 14 and 17.

The strain gauges 23 and 24 include, for example, a piezoresistive element 23a, 23b, 24a, 24b formed by diffusing impurities into the Si layer 53. When the rotation angle $\theta_x$ of the mirror 12 (the movable plate 11) changes, the stress applied to the piezoresistive element 23a, 23b, 24a, 24b changes. The electric resistance of the piezoresistive element 23a, 23b, 24a, 24b changes in accordance with the change in the stress. The twist angle of the twist beams 14 and 17, i.e., the rotation angle $\theta_x$ of the mirror 12 (the movable plate 11) about the twist beams 14 and 17 (x axis) may be detected from the change in the electric resistance of the piezoresistive element 23a, 23b, 24a, 24b.

With reference to FIGS. 2, 4 and 7, the temperature sensor 28 detects a temperature of the movable plate 11. The temperature sensor 28 is disposed on the movable plate 11. The temperature sensor 28 may be disposed, for example, between the first coil. 20 and the mirror 12. The temperature sensor 28 is, for example, a diode formed by diffusing impurities into the Si layer 53. When the temperature of the movable plate 11 changes, the forward voltage of the diode changes. The temperature of the movable plate 11 is detected by detecting the forward voltage of the diode.

The terminals 30a, 30b, 33a, 33b, 34a, 34b, 38a and 38b are disposed on the fixed member 10. The terminals 30a, 30b, 33a, 33b, 34a, 34b, 38a and 38b may be formed of the same material as the first coil 20 and the wires 40a, 40b, 43a, 43b, 43c, 44a, 44b, 44c, 48a and 48b. The terminals 30a and 30b are provided for the first coil 20. The terminals 33a and 33b are provided for the strain gauge 23, The terminals 34a and 341 are provided for the strain gauge 24. The terminals 38a and 38b are provided for the temperature sensor 28.

Each of the wires 40a, 40b, 43a, 43b, 43c, 44a, 44b, 44c, 48a and 48b is formed of a metal layer such as aluminum, gold, silver, or copper. Each of the wires 40a, 40b, 43a, 43b, 43c, 44a, 44b, 44c, 48a and 48b may be formed of the same material as the first coil 20.

The wires 40a and 40b extend from the movable plate 11 to the fixed member 10. Specifically, the wire 40a extends from the first coil 20 to the terminal 30a. The wire 40a is formed on the meander beam 15, but is not formed on the twist beam 14. The wire 40b extends from the first coil 20 to the terminal 30b. The wire 40h is formed on the meander beam 15, but is not formed on the twist beam 14.

The wires 48a and 48b extend from the movable plate 11 to the fixed member 10. Specifically, the wire 48a extends from the temperature sensor 28 to the terminal 38a. The wire 48a is formed on the meander beam 18, but is not formed on the twist beam 17. The wire 48b extends from the temperature sensor 28 to the terminal 38b. The wire 48b is formed on the meander beam 18, but is not formed on the twist beam 17.

A plurality of wires (for example, two wires) are formed on each of the meander beams 15 and 18. All of the wires 40a, 40b, 48a and 48b extending from the movable plate 11 to the fixed member 10 are formed on the meander beams 15 and 18, but are not formed on the twist beams 14 and 17.

The wires 43a and 43b extend from the strain gauge 23 to the terminals 33a and 33b. Specifically, the wire 43a extends from the piezoresistive element 23a to the terminal 33a. The wire 43a is formed on the fixed member 10. The wire 43b extends from the piezoresistive element 23b to the terminal 33b. The wire 43b is formed on the fixed member 10. The wire 43c is connected to the piezoresistive element 23a and the piezoresistive element 23b. The wire 43c is formed on the twist beam 14. When the strain gauge 23 is disposed on the fixed member 10, the wire 43c may be formed on the fixed member 10. The wire 43c extends mainly along the width direction (the second direction (y direction)) of the twist beam 14.

The wires 44a and 44b extend from the strain gauge 24 to the terminals 34a and 34b. Specifically, the wire 44a extends from the piezoresistive element 24a to the terminal 34a. The wire 44a is formed on the fixed member 10. The wire 44b extends from the piezoresistive element 24b to the terminal 34b. The wire 44b is formed on the fixed member 10. The wire 44c is connected to the piezoresistive element 24a and the piezoresistive element 24b. The wire 44c is formed on the twist beam 17. When the strain gauge 24 is disposed on the fixed member 10, the wire 44c may be formed on the fixed member 10. The wire 44c extends mainly along the width direction (the second direction (y direction)) of the twist beam 17.

With reference to FIGS. 2 and 3, the wire 40b includes a first bridge wire and a second bridge wire. The first bridge wire of the wire 40b straddles the wires 43a and 43b. The insulating layer 56 is formed between the first bridge wire of the wire 40b and the wires 43a and 43b. The wire 40h and the wires 43a and 43b are electrically insulated from each other by the insulating layer 56. The second bridge wire of the wire 40b straddles the first coil 20. The insulating layer 56 is formed between the second bridge wire of the wire 40b and the first coil 20. The wire 40b and the first coil 20 are electrically insulated from each other by the insulating layer 56.

With reference to FIGS. 2 and 4, the wire 48a includes a bridge wire. The bridge wire of the wire 48a straddles the first coil 20. The insulating layer 56 is formed between the bridge wire of the wire 48a and the first coil 20. The wire 48a and the first coil 20 are electrically insulated from each other by the insulating layer 56.

With reference to FIGS. 2 and 4, the wire 48b includes a first bridge wire and a second bridge wire. The first bridge wire of the wire 48h straddles the wires 44a and 44b, The insulating layer 56 is formed between the first bridge wire of the wire 48b and the wires 44a and 44b. The wire 48b and the wires 44a and 44b are electrically insulated from each other by the insulating layer 56. The second bridge wire of the wire 48b straddles the first coil 20. The insulating layer 56 is formed between the second bridge wire of the wire 48b and the first coil 20. The wire 48b and the first coil 20 are electrically insulated from each other by the insulating layer 56.

With reference to FIG. 1, the controller 8 is connected to the MEMS mirror device 1, and controls the MEMS mirror device 1.

The controller 8 is, for example, a microcomputer including a processor, a RAM (Random Access Memory), and a storage unit such as a ROM (Read Only Memory). As the processor, for example, a CPU (Central Processing Unit) may be adopted. The RAM functions as a working memory for temporarily storing data to be processed by the processor. The storage unit stores, for example, a program to be executed by the processor. In the present embodiment, the controller 8 controls the MEMS mirror device 1 by causing the processor to execute a program stored in the storage unit. Instead of the microcomputer, a FPGA (Field-Programmable Gate Array) may be adopted as the controller 8. The various processes in the controller 8 are not limited to being executed by software, but may be executed by dedicated hardware (electronic circuits).

For example, the controller 8 adjusts at least one of the amplitude, frequency, and phase of an AC current 9a supplied to the first coil 20. For example, when the temperature of the movable member including the movable plate 11 or the like changes, the resonance frequency of the rotational motion of the movable member may change. Ihe controller 8 receives a signal related to the temperature of the movable plate 11 from the temperature sensor 28. The controller 8 changes a first frequency of the AC current 9a supplied to the first coil 20 based on the temperature of the movable plate 11 so that the first frequency of the AC current 9a supplied to the first coil 20 coincides with the resonance frequency of the rotational motion of the movable member about the twist beams 14 and 17. Thus, the rotation angle of the mirror 12 (the scanning angle of the light reflected by the mirror 12) can be maintained.

The operation of the MEMS mirror device 1 will be described with reference to FIGS. 1, 2, and 10.

As illustrated in FIGS. 1 and 2, the magnetic field generators 4a and 4b apply a magnetic field 5 to the MEMS mirror device 1 in the second direction (y direction). The controller 8 supplies an AC current 9a to the first coil 20. The first frequency of the AC current 9a is set to coincide with the resonance frequency of the rotational motion of the movable member about the twist beams 14 and 17. Therefore, it is possible to use a smaller AC current 9a to swing the mirror 12 (the movable plate 11) at a greater deflection angle and swing the mirror 12 (the movable plate 11) at a higher speed. The magnetic field 5 and the AC current 9a generate a first electromagnetic force. As illustrated in FIG. 10, the first electromagnetic force swings the mirror 12 (the movable plate 11) about the twist beams 14 and 17, Thus, the MEMS mirror device 1 can perform an optical scanning in the first direction (x direction).

An example of a manufacturing method of the MEMS mirror device 1 according to the present embodiment will be described with reference to FIGS. 12 to 22.

Figure 12:
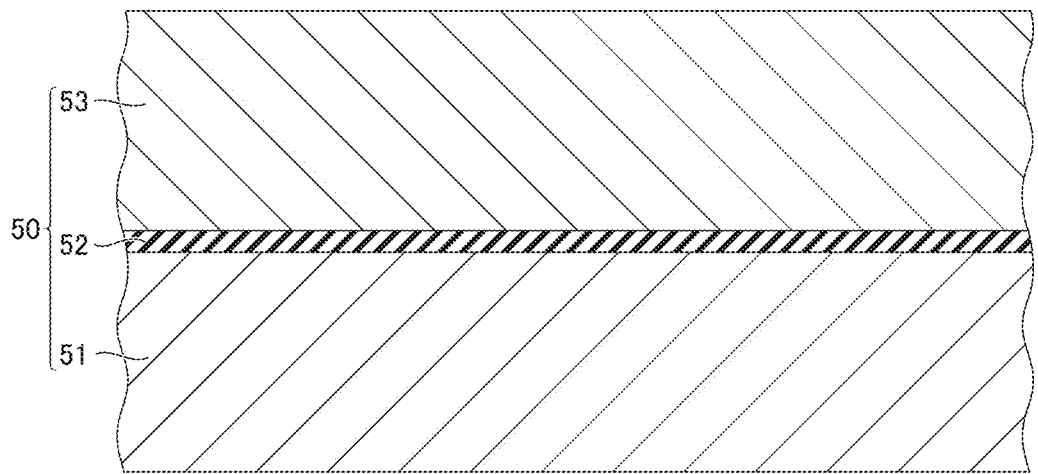
FIG. 12 is a schematic enlarged cross-sectional view illustrating a step of a manufacturing method of the MEMS mirror device according to the first embodiment.

With reference to FIG. 12, an SOI substrate 50 is prepared. The SOT substrate 50 includes a Si support layer 51, an insulating layer 52, and a Si layer 53. The insulating layer 52 is, for example, a SiO$_2$ layer.

Figure 13:
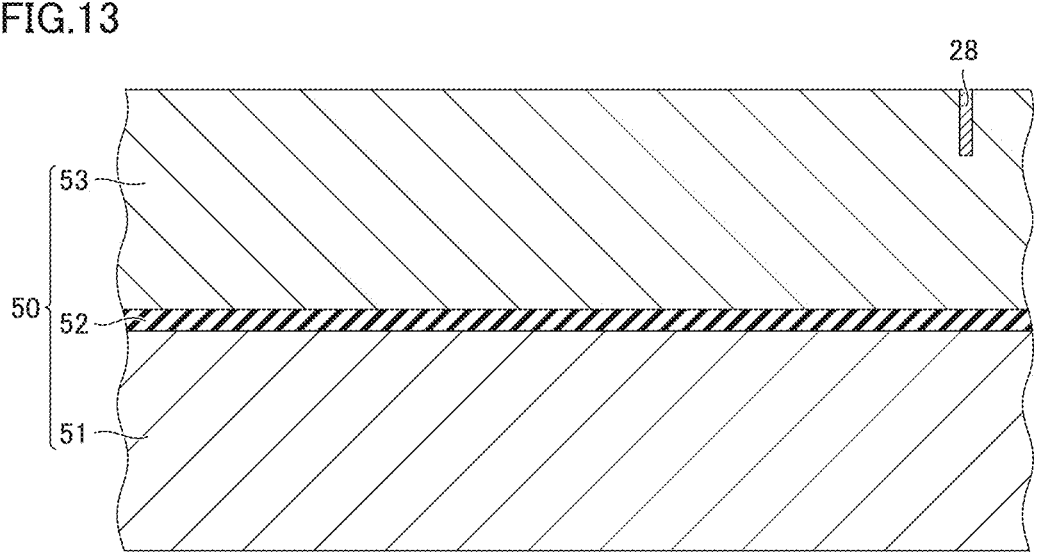
FIG. 13 is a schematic enlarged cross-sectional view illustrating a step subsequent to the step illustrated in FIG. 12 in the manufacturing method of the MEMS mirror device according to the first embodiment.

With reference to FIG. 13, a temperature sensor 28 and strain gauges 23 and 24 are formed. As an example, the temperature sensor 28 and the strain gauges 23 and 24 are formed by adding impurities to the Si layer 53.

Figure 14:
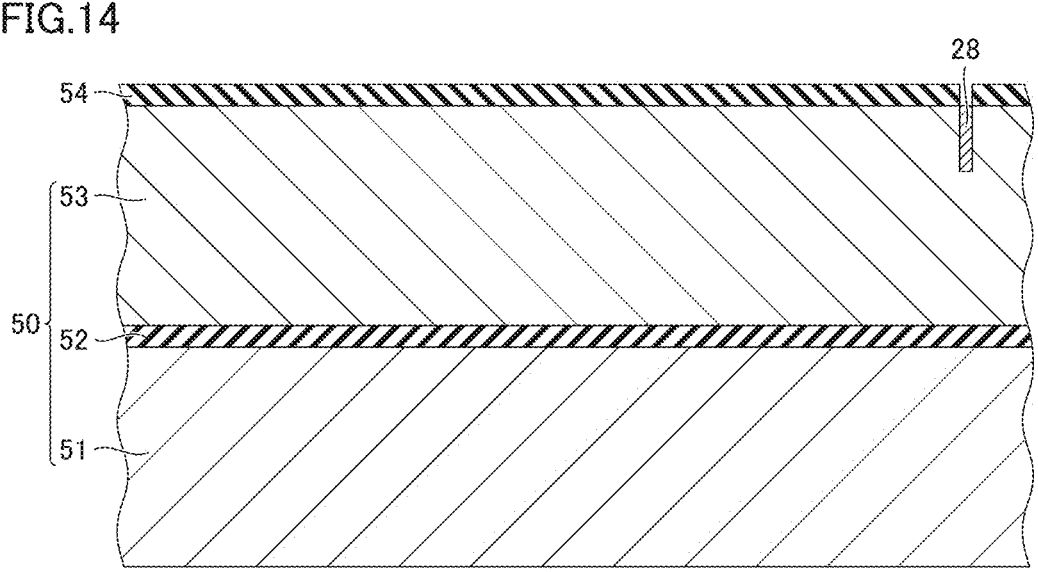
FIG. 14 is a schematic enlarged cross-sectional view illustrating a step subsequent to the step illustrated in FIG. 13 in the manufacturing method of the MEMS mirror device according to the first embodiment.

With reference to FIG. 14, an insulating layer 54 is formed on the SOI substrate 50 (the Si layer 53). The insulating layer 54 is, for example, a SiO$_2$ layer. The insulating layer 54 may be formed by, for example, a plasma CVD method. Then, a part of the insulating layer 54 is etched to form a contact hole on the insulating layer 54. Thereby, at least a part of the temperature sensor 28 and at least a part of the strain gauges 23 and 24 are exposed from the insulating layer 54.

Figure 15:
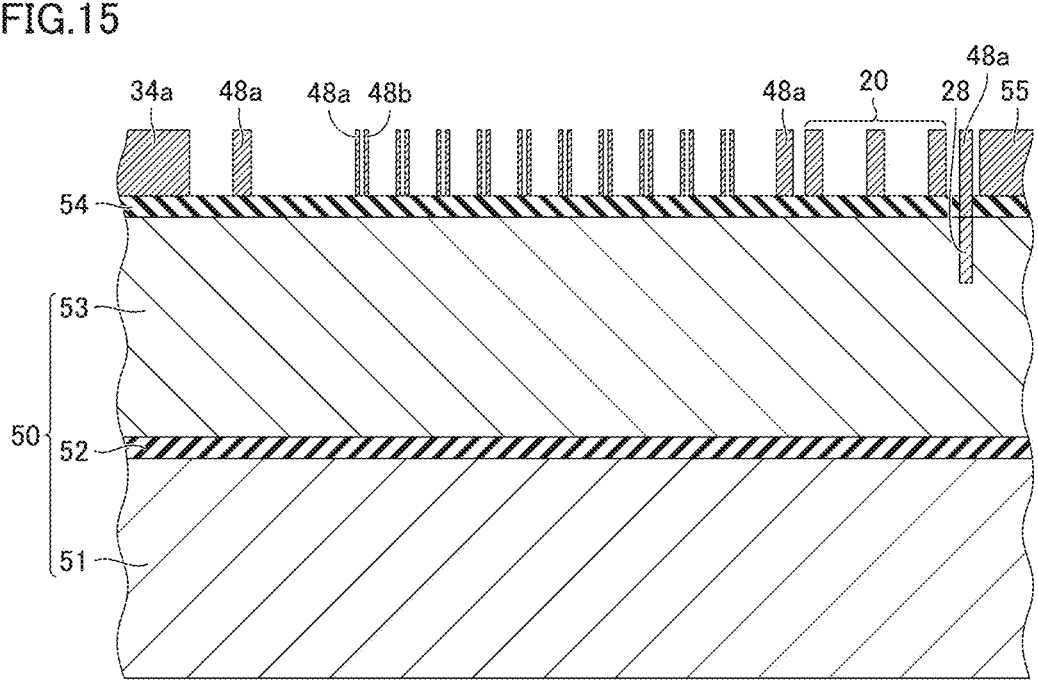
FIG. 15 is a schematic enlarged cross-sectional view illustrating a step subsequent to the step illustrated in FIG. 14 in the manufacturing method of the MEMS mirror device according to the first embodiment.

With reference to FIG. 15, a metal film is formed of aluminum, gold, silver, copper or the like on insulating layer 54, Then, a part of the metal film is etched. Thus, the wires 40a, 40b, 43a, 43b, 43c, 44a, 44b, 44c, 48a and 48b (except for the bridge wires of the wires 40b, 48a, 48b), the metal layer 55, and the terminals 30a, 30b, 33a, 33b, 34a, 34b, 38a and 38b are formed.

Figure 16:
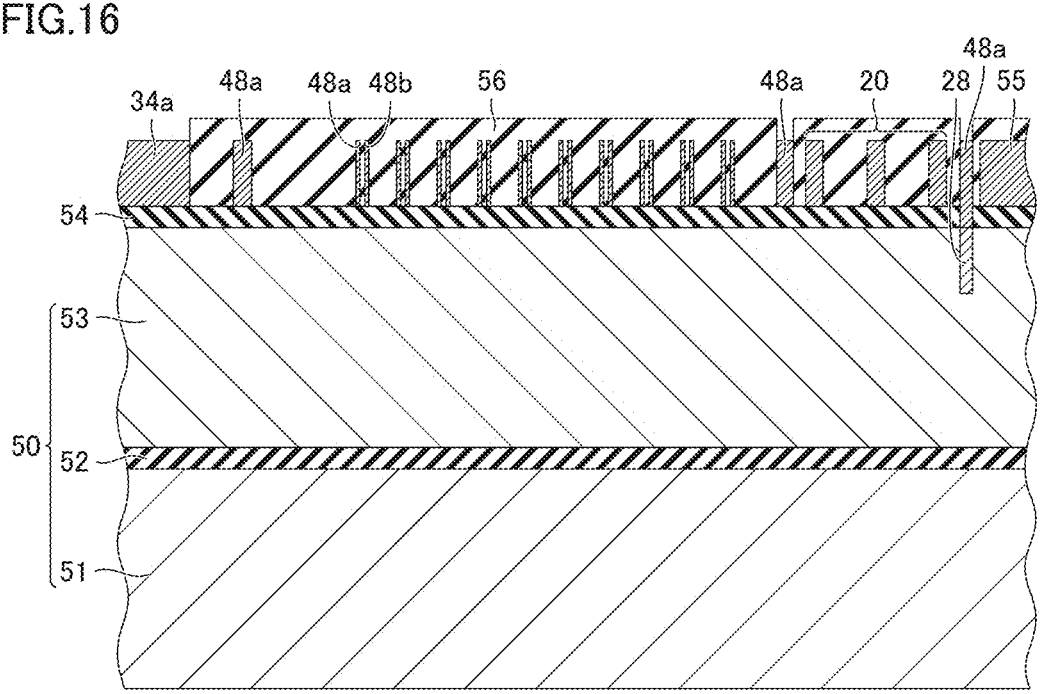
FIG. 16 is a schematic enlarged cross-sectional view illustrating a step subsequent to the step illustrated in FIG. 15 in the manufacturing method of the MEMS mirror device according to the first embodiment.

With reference to FIG. 16, an insulating layer 56 is formed on the wires 40a, 40b, 43a, 43b, 43c, 44a, 44b, 44c, 48a and 48b (except for the bridge wires of the wires 40b, 48a, and 48b), the metal layer 55, and the terminals 30a, 30b, 33a, 33b, 34a, 34b, 38a and 38b. The insulating layer 56 is, for example, an inorganic insulating layer such as a SiO$_2$ layer or an organic insulating layer. The insulating layer 56 may be formed by, for example, a plasma CVD method or a coating method. Then, a part of the insulating layer 56 is etched. Thereby, the terminals 30a, 30b, 33a, 33b, 34a, 34b, 38a and 38b are exposed from the insulating layer 56, and a part of the wires 40b, 48a and 48b is exposed from the insulating layer 56.

Figure 17:
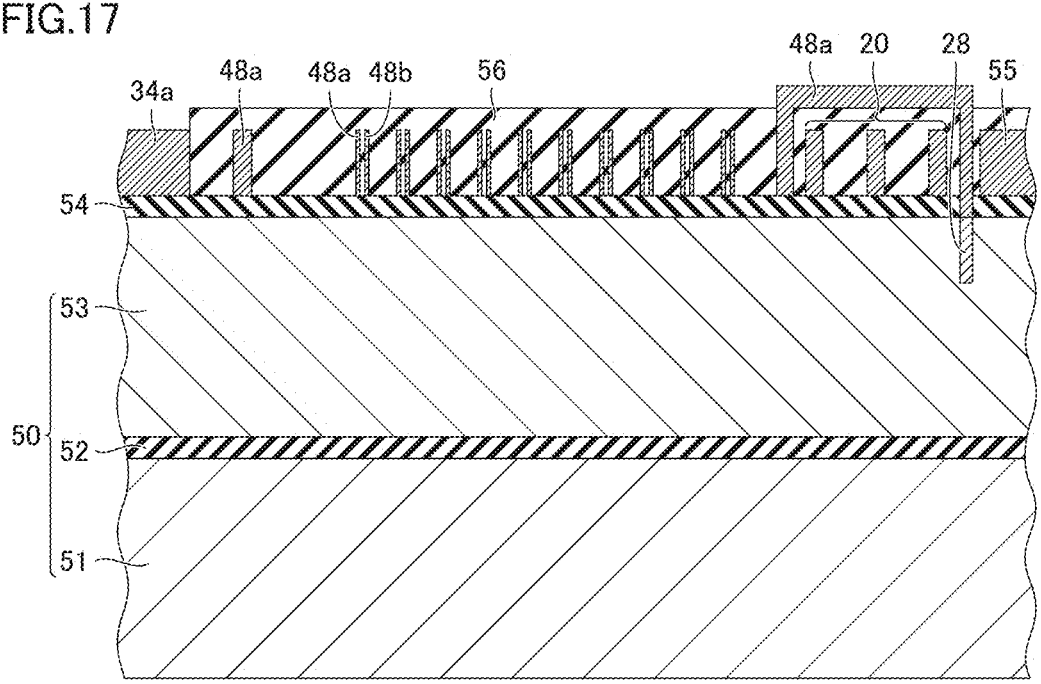
FIG. 17 is a schematic enlarged cross-sectional view illustrating a step subsequent to the step illustrated in FIG. 16 in the manufacturing method of the MEMS mirror device according to the first embodiment.

With reference to FIG. 17, a metal film such as aluminum, gold, silver, or copper is formed on a part of the insulating layer 56. Then, a part of the metal film is etched. Thus, the bridge wires of the wires 40b, 48a and 48b are formed.

Figure 18:
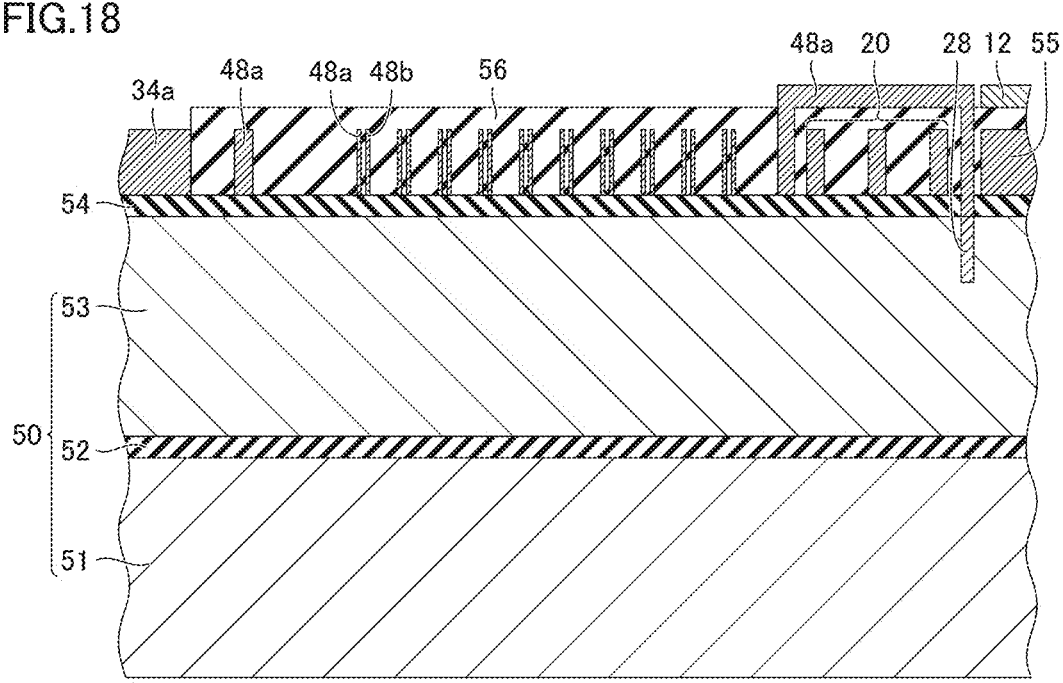
FIG. 18 is a schematic enlarged cross-sectional view illustrating a step subsequent to the step illustrated in FIG. 17 in the manufacturing method of the MEMS mirror device according to the first embodiment.

With reference to FIG. 18, the mirror 12 is formed on insulating layer 56 by vapor deposition or the like. An underlying layer (not shown) such as a Cr film may be formed between the mirror 12 and the insulating layer 56.

Figure 19:
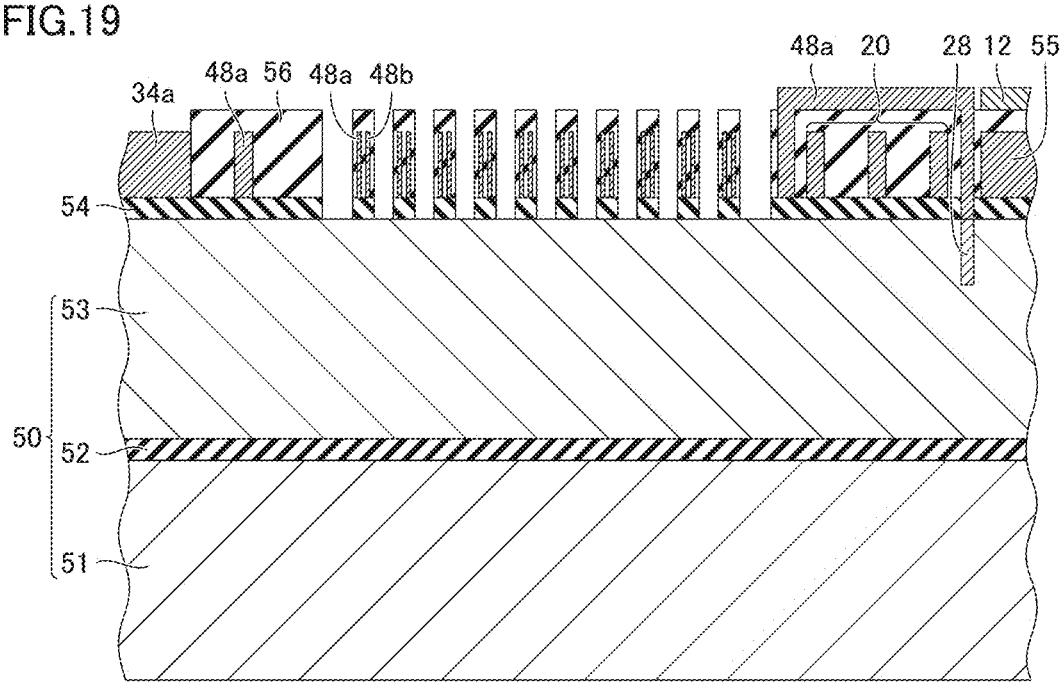
FIG. 19 is a schematic enlarged cross-sectional view illustrating a step subsequent to the step illustrated in FIG. 18 in the manufacturing method of the MEMS mirror device of the first embodiment.

With reference to FIG. 19, a part of the insulating layer 54 and a part of the insulating layer 56 are etched. A part of the insulating layer 54 and a part of the insulating layer 56 may be selectively etched from the Si layer 53, for example, by reactive ion etching (RIE).

Figure 20:
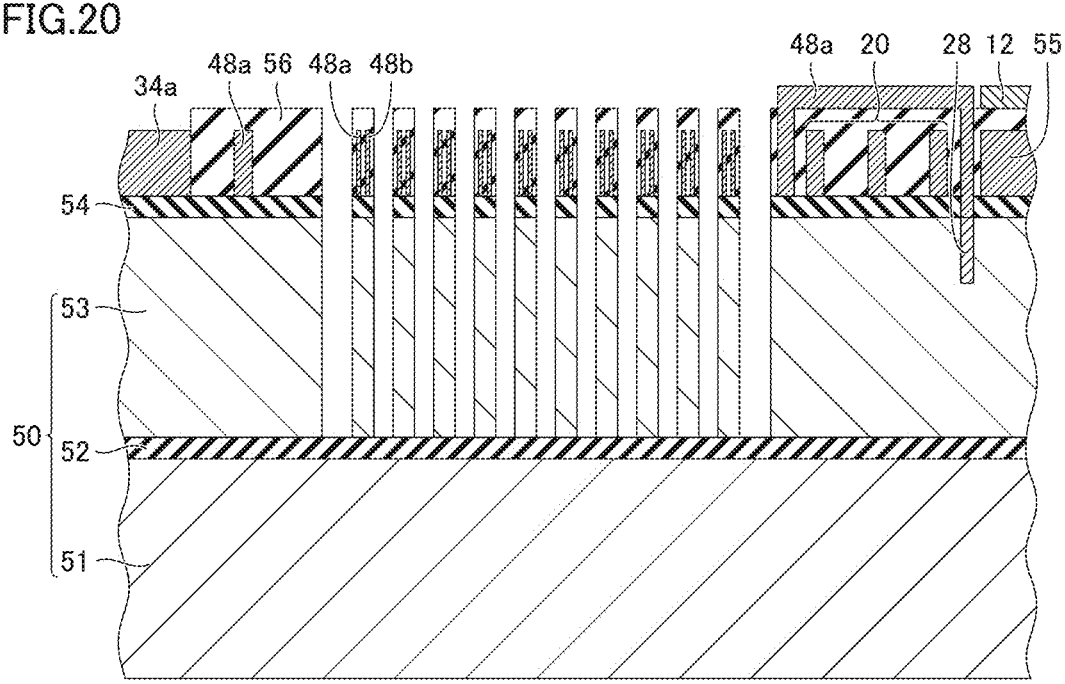
FIG. 20 is a schematic enlarged cross-sectional view illustrating a step subsequent to the step illustrated in FIG. 19 in the manufacturing method of the MEMS mirror device of the first embodiment.

With reference to FIG. 20, a part of the Si layer 53 is etched from the front surface side of the SOI substrate 50 by, for example, deep reactive ion etching (DRIE). The insulating layer 52 functions as a DRIE etching stopper.

Figure 21:
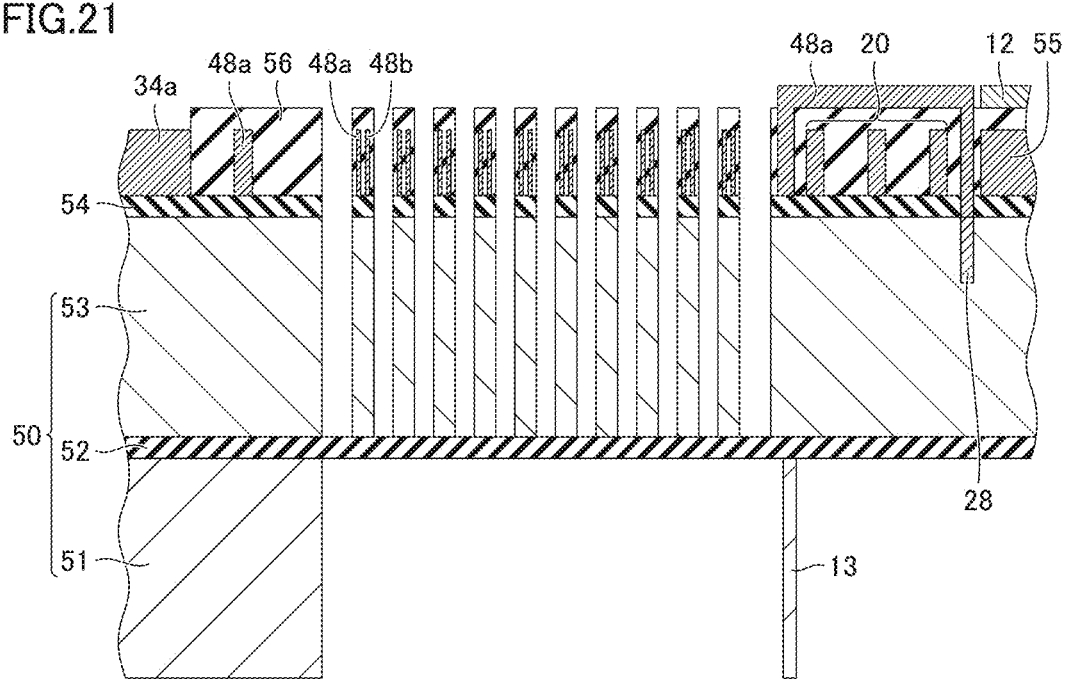
FIG. 21 is a schematic enlarged cross-sectional view illustrating a step subsequent to the step illustrated in FIG. 20 in the manufacturing method of the MEMS mirror device of the first embodiment.

With reference to FIG. 21, for example, a part of the Si support layer 51 is etched from the rear surface side of the SOI substrate 50 by deep reactive ion etching (DRIE) to form a rib 13 including a part of the Si support layer 51. The insulating layer 52 functions as a DRIE etching stopper.

Figure 22:
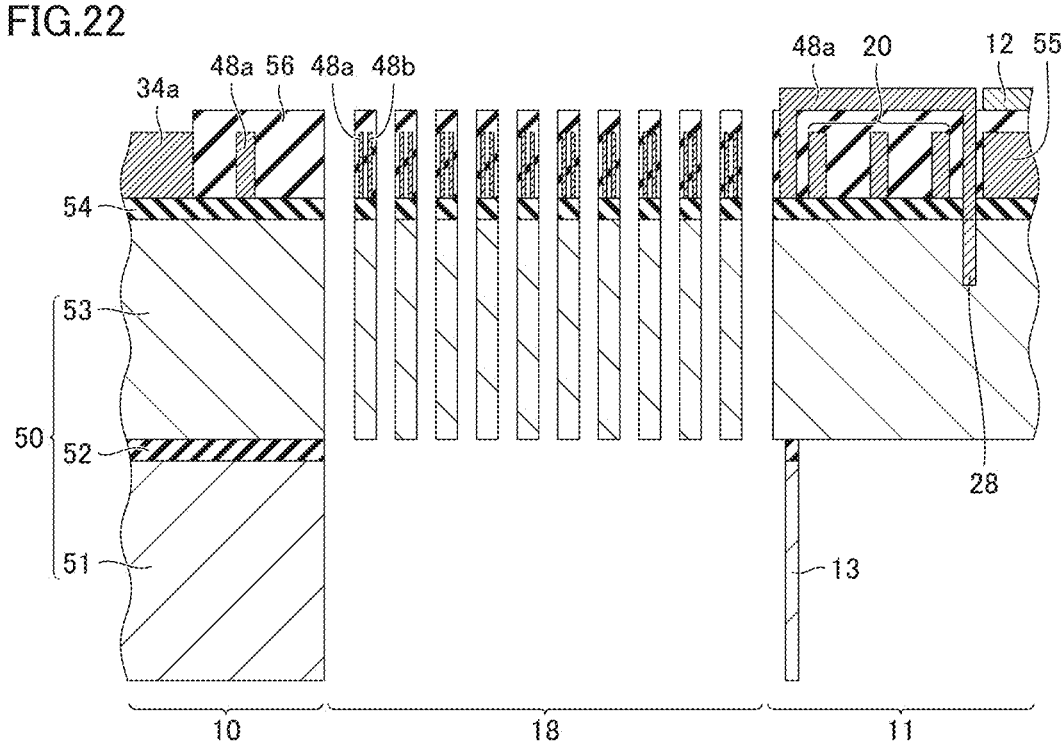
FIG. 22 is a schematic enlarged cross-sectional view taken along a line XXII-XXII for illustrating the MEMS mirror device of the first embodiment illustrated in FIG. 4 and is a schematic enlarged cross-sectional view illustrating a step subsequent to the step illustrated in FIG. 21 in the manufacturing method of the MEMS mirror device of the first embodiment.

With reference to FIG. 22, a part of the insulating layer 52 is etched from the rear surface side of the SOI substrate 50. Thereby, twist beams 14 and 17 and meander beams 15 and 18 are formed. A part of the insulating layer 52 is selectively etched from the Si support layer 51 and the Si layer 53, for example, by reactive ion etching (RIE). Thus, the MEMS mirror device 1 illustrated in FIGS. 2 to 8 is obtained.

The effects of the MEMS mirror device 1 of the present embodiment will be described.

The MEMS mirror device 1 of the present embodiment includes a fixed member 10, a movable member rotatably coupled to the fixed member 10, a mirror 12, and at least one first wire (for example, the wires 40a, 40b, 48a and 48b). The movable member includes a movable plate 11 having a front surface 11a, at least one first twist beam (for example, the twist beams 14 and 17) connected to the movable plate 11, and at least one first meander beam (for example, the meander beams 15 and 18) connected to the movable plate 11. The longitudinal direction of the at least one first twist beam is in the first direction (x direction). The at least one first meander beam is disposed along the at least one first twist beam. The mirror 12 is formed on the front surface 11a of the movable plate 11. The at least one first wire extends from the movable plate 11 to the fixed member 10. The at least one first wire is formed on the at least one first meander beam.

Thereby, it is possible to reduce the number of wires which are formed on the at least one first twist beam (for example, the twist beams 14 and 17) and extend along the longitudinal direction of the at least one first twist beam, which makes it possible to reduce the width of the at least one first twist beam. Thereby, the MEMS mirror device 1 can have a larger optical scanning angle.

In the MEMS mirror device 1 of the present embodiment, the natural vibration frequency of the at least one first meander beam (for example, the meander beams 15 and 18) when both ends of the at least one first meander beam are fixed is larger than the resonance frequency of the first rotational motion of the movable member about the at least one first twist beam (for example, the twist beams 14 and 17).

Therefore, the at least one first meander beam (for example, the meander beams 15 and 18) smoothly follows the rotational motion of the movable plate 11 about the at least one first twist beam (for example, the twist beams 14 and 17). Thereby, the MEMS mirror device 1 can perform more stable optical scanning.

In the MEMS mirror device 1 of the present embodiment, the at least one first meander beam (for example, the meander beams 15 and 18) has a lower rigidity than the at least one first twist beam (for example, the twist beams 14 and 17).

Therefore, it is possible to reduce the stress generated on the surface of the at least one first meander beam (for example, the meander beams 15 and 18) lower than the stress generated on the surface of the at least one first twist beam (for example, the twist beams 14 and 17) when the mirror 12 (the movable plate 11) is rotated to twist the at least one first twist beam and the at least one first meander beam. Thereby, it is possible to reduce the stress applied to the wires formed on the surface of the at least one first meander beam lower than the stress applied to the wires formed on the surface of the at least one first twist beam. Accordingly, during the operation of the MEMS mirror device 1, it is difficult for the at least one first wire (for example, the wires 40a, 40b, 48a and 48b) to deteriorate or break. Thereby, the reliability of the MEMS mirror device 1 is improved.

In the MEMS mirror device 1 of the present embodiment, the at least one first meander beam (for example, the meander beams 15 and 18) includes a plurality of first meander beams (for example, the meander beams 15 and 18). The plurality of first meander beams are disposed rotationally symmetrically with respect to the center 11c of the movable plate 11 in a plan view of the front surface 11a of the movable plate 11.

Therefore, it is possible to rotate the mirror 12 (the movable plate 11) symmetrically about the at least one first twist beam (for example, the twist beams 14 and 17), which make it possible for the MEMS mirror device 1 to perform an optical scanning symmetrically. Further, since the stress applied to the movable plate 11 is symmetrical, it is possible to reduce or eliminate the surface strain of the mirror 12 (the movable plate 11).

In the MEMS mirror device 1 of the present embodiment, the at least one first wire (for example, the wires 40a, 40b, 48a and 48b) includes a plurality of first wires. The plurality of first wires are formed on the at least one first meander beam (for example, the meander beams 15 and 18).

Since more wires can be formed on the at least one first meander beam (for example, the meander beams 15 and 18), it is possible to reduce the number of wires formed on the at least one first twist beam (for example, the twist beams 14 and 17). Therefore, the MEMS mirror device 1 can have a larger optical scanning angle.

In the MEMS mirror device 1 of the present embodiment, the at least one first twist beam (for example, the twist beams 14 and 17) has the same layer structure as the at least one first meander beam (for example, the meander beams 15 and 18).

Therefore, it is possible to manufacture the at least one first twist beam (for example, the twist beams 14 and 17) and the at least one first meander beam (for example, the meander beams 15 and 18) by the same process, which makes it possible to reduce the manufacturing cost of the MEMS mirror device 1.

The MEMS mirror device 1 of the present embodiment further includes a first coil 20 disposed on the movable plate 11. The at least one first wire (for example, the wires 40a, 40b, 48a and 48b) includes a first coil wire (for example, the wire 40a, 40b) connected to the first coil 20.

Therefore, it is possible to reduce the number of first coil wires (for example, wires 40a and 40b) which are formed on the at least one first twist beam (for example, the twist beams 14 and 17) and extend along the longitudinal direction of the at least one first twist beam, Which makes it possible to reduce the width of the at least one first twist beam. Therefore, the MEMS mirror device 1 can have a larger optical scanning angle.

The MEMS mirror device 1 of the present embodiment further includes a temperature sensor 28 disposed on the movable plate 11. The at least one first wire (for example, the wires 40a, 40b, 48a and 48b) includes a temperature sensor wire (for example, the wires 48a and 48b) connected to the temperature sensor 28.

Therefore, it is possible to reduce the number of temperature sensor wires (for example, the wires 48a and 48b) which are formed on at least one first twist beam (for example, the twist beams 14 and 17) and extend along the longitudinal direction of the at least one first twist beam, which makes it possible to reduce the width of the at least one first twist beam. Therefore, the MEMS mirror device 1 can have a larger optical scanning angle.

In the MEMS mirror device 1 of the present embodiment, all the wires (for example, the wires 40a, 40b, 48a and 48b) including the at least one first wire (for example, the wires 40a, 40b, 48a and 48b) and extending from the movable plate 11 to the fixed member 10 are formed on the at least one first meander beam (for example, the meander beams 15 and 18).

Therefore, it is possible to prevent the wires from being formed on the at least one first twist beam (for example, the twist beams 14 and 17) and extending along the longitudinal direction of the at least one first twist beam, which makes it possible to reduce the width of the at least one first twist beam. Therefore, the MEMS mirror device 1 can have a larger optical scanning angle.

Second Embodiment

Figure 23:
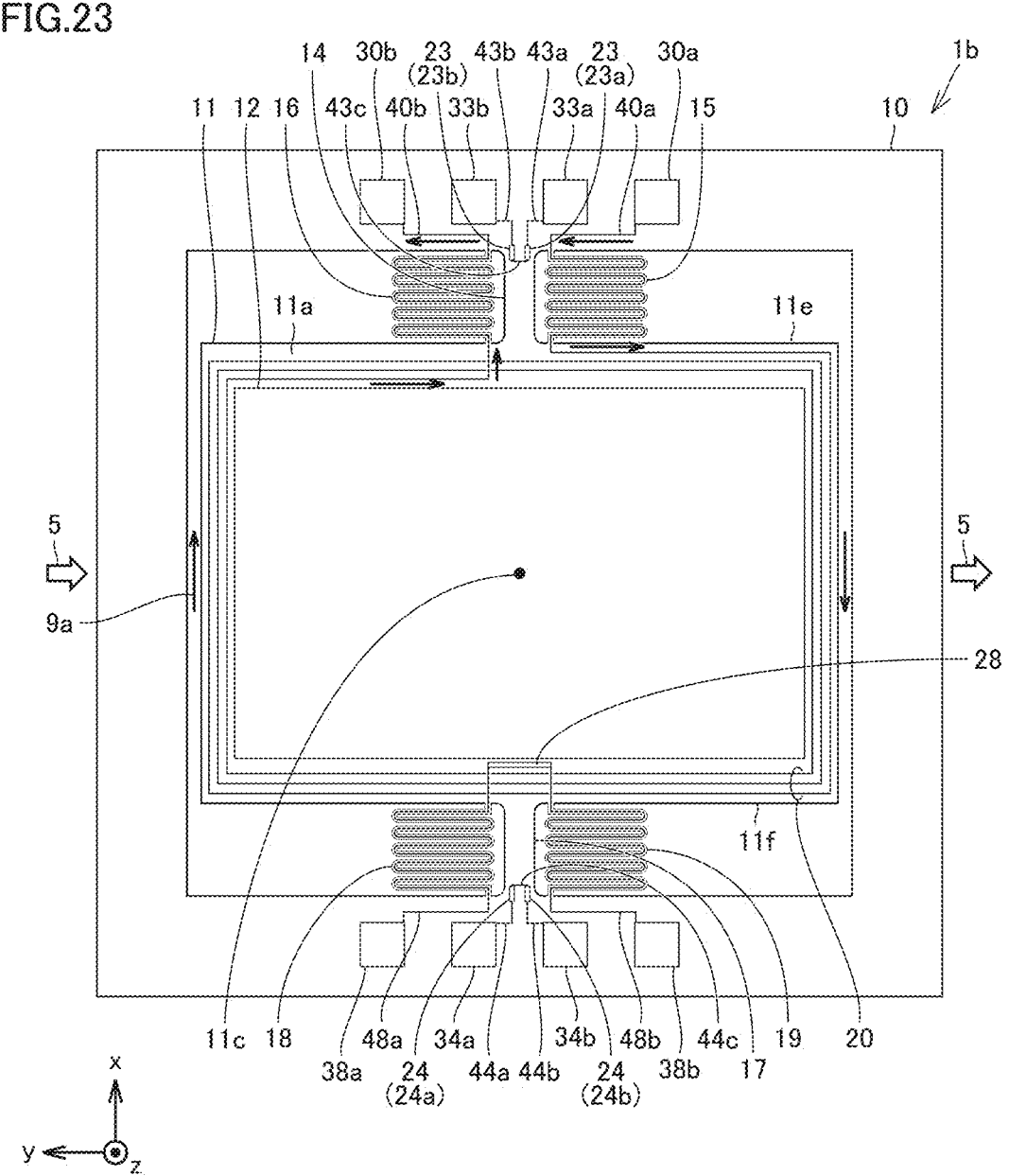
FIG. 23 is a schematic front view illustrating a MEMS mirror device according to a second embodiment.

With reference to FIG. 1, an optical scanning device 2b according to a second embodiment will be described. The optical scanning device 2b of the present embodiment includes a MEMS mirror device 1b of the present embodiment instead of the MEMS mirror device 1 of the first embodiment. With reference to FIG. 23, the MEMS mirror device 1b of the present embodiment has a configuration similar to the MEMS mirror device 1 of the first embodiment, but is different from that mainly in the following points.

In the present embodiment, the movable member further includes meander beams 16 and 19. The meander beams 16 and 19 are configured similarly to the meander beams 15 and 18, but are different from the meander beans 15 and 18 mainly in the arrangement with respect to the twist beams 14 and 17.

Specifically, the meander beams 16 and 19 are connected to the movable plate 11, The meander beams 15 and 16 and the twist beam 14 are connected to the same surface (specifically, the first side surface 11e) of the movable plate 11. The meander beams 15 and 16 are arranged along the twist beam 14. The meander beams 18 and 19 and the twist beam 17 are connected to the same surface (specifically, the second side surface 11f) of the movable plate 11. The meander beams 18, 19 are arranged along the twist beam 17.

The meander beams 16 and 19 may be disposed at a position where a stress applied to the meander beams 16 and 19 is low when the movable plate 11 is rotated and a stress applied from the twist beams 14 and 17 to the meander beams 16 and 19 is low when the twist beams 14 and 17 are twisted. The meander beam 16 is disposed on a second side (+y side) of the twist beam 14. The meander beam 19 is disposed on a first side (−y side) of the twist beam 17.

Specifically, the meander beams 15, 16, 18, and 19 are disposed rotationally symmetrically with respect to the center 11c of the movable plate 11 in a plan view of the front surface 11a of the movable plate 11. The meander beams 15 and 16 are disposed on both sides of the twist beam 14 symmetrically with respect to the twist beam 14. The meander beams 18 and 19 are disposed on both sides of the twist beam 17 symmetrically with respect to the twist beam 17.

Figure 24:
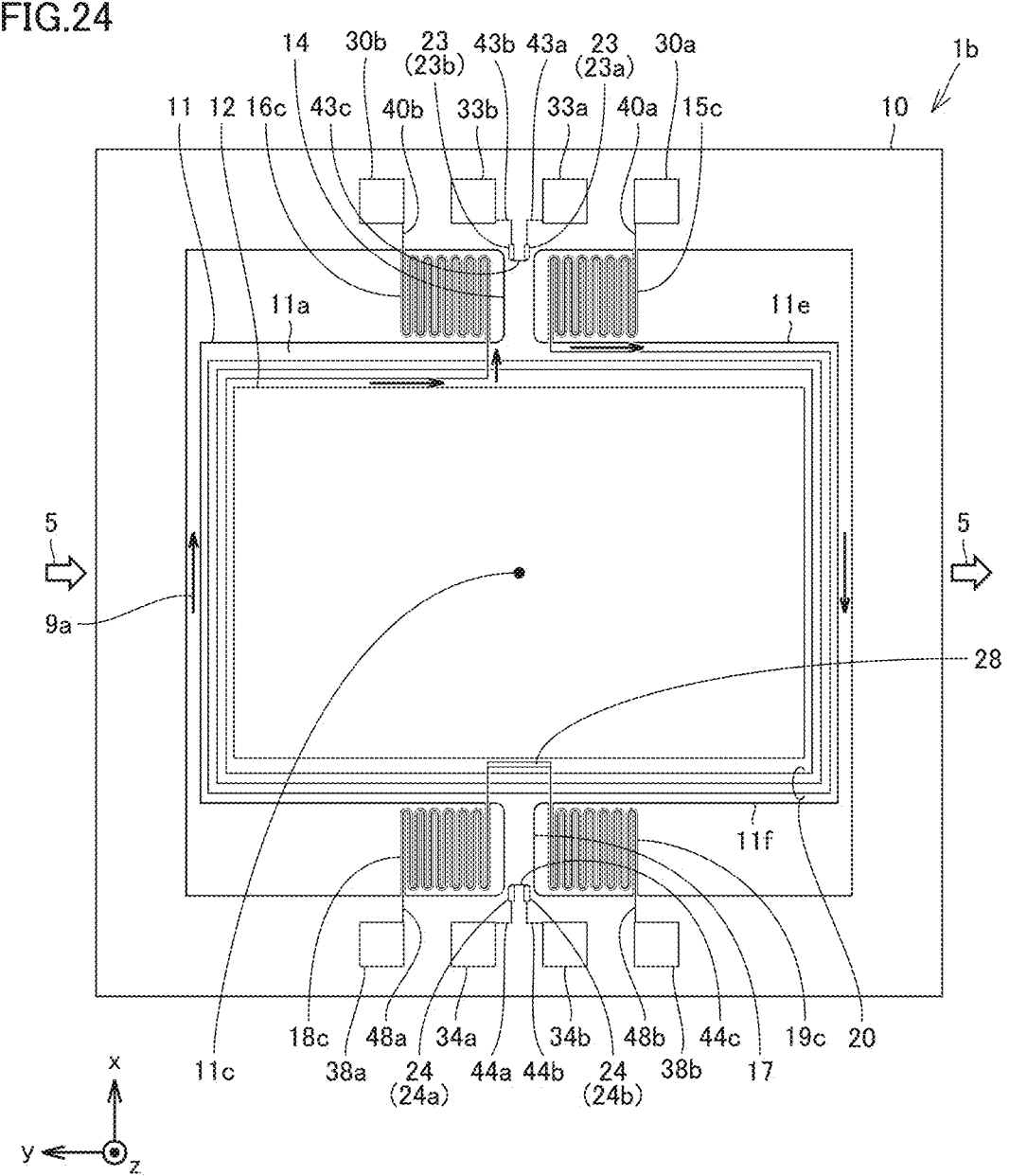
FIG. 24 is a schematic front view illustrating a MEMS mirror device according to a modification of the second embodiment.

The folding direction of the meander beams 15, 16, 18, and 19 is in the second direction (y direction). As illustrated in FIG. 24, the folding direction of the meander beams 15, 16, 18, and 19 may be in the first direction (x direction). The twist beams 14 and 17 may have the same layer structure as the meander beams 15, 16, 18 and 19.

The natural vibration frequency of the meander beams 15, 16, 18, and 19 when both ends of the meander beams 15, 16, 18, and 19 are fixed is larger than the resonance frequency of the rotational motion of the movable member about the twist beams 14 and 17. The natural vibration frequency of the meander beams 15, 16, 18, and 19 refers to the natural vibration frequency of each of the meander beams 15, 16, 18, and 19 in the primary natural vibration mode when both ends of each of the meander beams 15, 16, 18, and 19 are fixed. Therefore, the meander beams 15, 16, 18, and 19 smoothly follow the rotational motion of the movable plate 11 about the twist beams 14 and 17 without hindering the rotational motion of the movable plate 11. The rigidity of the meander beams 15, 16, 18, and 19 is lower than that of the twist beams 14 and 17.

The wire 40a is formed on the meander beam 15, but is not formed on the twist beam 14. The wire 40b is formed on the meander beam 16, but is not formed on the twist beam 14. The wire 48a is formed on the meander beam 18, but is not formed on the twist beam 17, The wire 48b is formed on the meander beam 19, but is not formed on the twist beam 17. Only one wire is formed on each of the meander beams 15, 16, 18, and 19. All the wires 40a, 40b, 48a and 48b extending from the movable plate 11 to the fixed member 10 are formed on the meander beams 15, 16, 18, and 19, but are not formed on the twist beams 14 and 17.

The MEMS mirror device 1b of the present embodiment has the following effects in addition to the effects of the MEMS mirror device 1 of the first embodiment.

The number of wires formed on each of the meander beams 15 and 18 of the MEMS mirror device 1b of the present embodiment is smaller than the number of wires formed on each of the meander beams 15 and 18 of the MEMS mirror device 1 of the first embodiment. Therefore, even if the width of each of the meander beams 15 and 18 of the present embodiment is the same as the width of each of the meander beams 15 and 18 of the first embodiment, the width of each of the wires 40a and 40b of the present embodiment can be made larger than the width of each of the wires 40a and 40b of the first embodiment. As a result, it is possible to flow a larger current through the wires 40a and 40b in the MEMS mirror device 1b of the present embodiment than that in the MEMS mirror device 1 of the first embodiment, which makes it possible to rotate the mirror 12 (the movable plate 11) at a larger angle. Thereby, the MEMS mirror device 1 can have a larger optical scanning angle.

In the MEMS mirror device 1b of the present embodiment, the meander beams 15 and 16 are disposed on both sides of the twist beam 14 symmetrically with respect to the twist beam 14. The meander beams 18 and 19 are disposed on both sides of the twist beam 17 symmetrically with respect to the twist beam 17. Therefore, the stability of the rotational motion of the mirror 12 (the movable plate 11) about the twist beams 14 and 17 is improved, which makes it possible for the MEMS mirror device 1 to perform more stable optical scanning.

Third Embodiment

Figure 25:
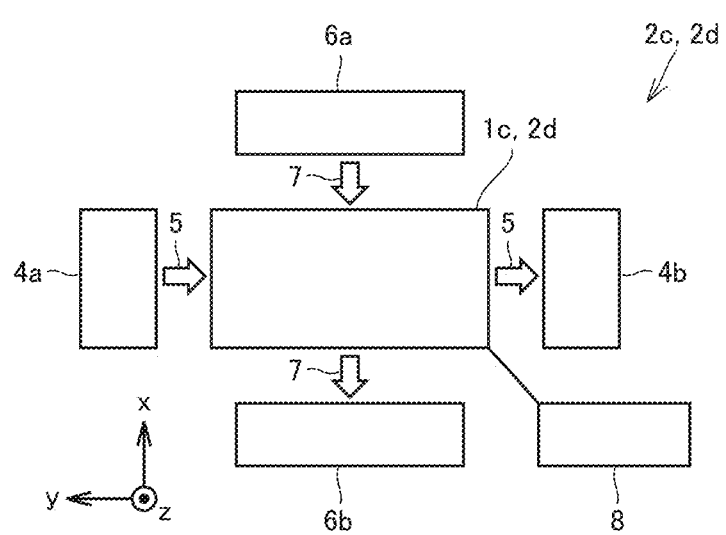
FIG. 25 is a schematic view illustrating an optical scanning device according to a third embodiment and a fourth embodiment.

With reference to FIG. 25, an optical scanning device 2c according to a third embodiment will be described. The optical scanning device 2c of the present embodiment has a configuration similar to the optical scanning device 2 of the first embodiment, but is different from the optical scanning device 2 of the first embodiment in the following points. The optical scanning device 2c includes a MEMS mirror device 1c instead of the MEMS mirror device 1. The optical scanning device 2c further includes magnetic field generators 6a and 6b.

The magnetic field generators 6a and 6b are configured to apply a magnetic field 7 to the MEMS mirror device 1c in the first direction (x direction). The magnetic field generators 6a and 6b are, for example, permanent magnets.

With reference to FIGS. 26 to 34, the MEMS mirror device 1c will be described. The MEMS mirror device 1c of the present embodiment has a configuration similar to the MEMS mirror device 1b of the second embodiment, hut is different from that mainly in the following points.

In the MEMS mirror device 1c, the movable member further includes a movable frame 61, twist beams 64 and 67, and meander beams 65, 66, 68 and 69. The movable member may further include ribs 63.

The movable frame 61 is disposed between the fixed member 10 and the movable plate 11. For example, the fixed member 10 is a fixed frame, and the movable frame 61 is disposed inside the fixed frame and outside the movable plate 11. The movable frame 61 includes a first outer side surface 61e, a second outer side surface 61f, a first inner side surface 61g, and a second inner side surface 61h.

Each of the first outer side surface 61e and the second outer side surface 61f faces the fixed member 10. Each of the first outer side surface 61e and the second outer side surface 61f may extend along the longitudinal direction of the movable frame 61, and may be a longitudinal side surface of the movable frame 61. Each of the first outer side surface 61e and the second outer side surface 61f may extend along the longitudinal direction of the movable plate 11, and may extend along the longitudinal side surface (the first side surface 11e and the second side surface 11f of the movable plate) of the movable plate 11. Each of the first inner side surface 61g and the second inner side surface 61h faces the movable plate 11. Each of the first inner side surface 61g and the second inner side surface 61h may extend along the transverse direction of the movable frame 61, and may be a transverse side surface of the movable frame 61. Each of the first inner side surface 61g and the second inner side surface 61h may extend along the transverse direction of the movable plate 11, and may extend along a transverse side surface of the movable plate 11.

Figure 31:
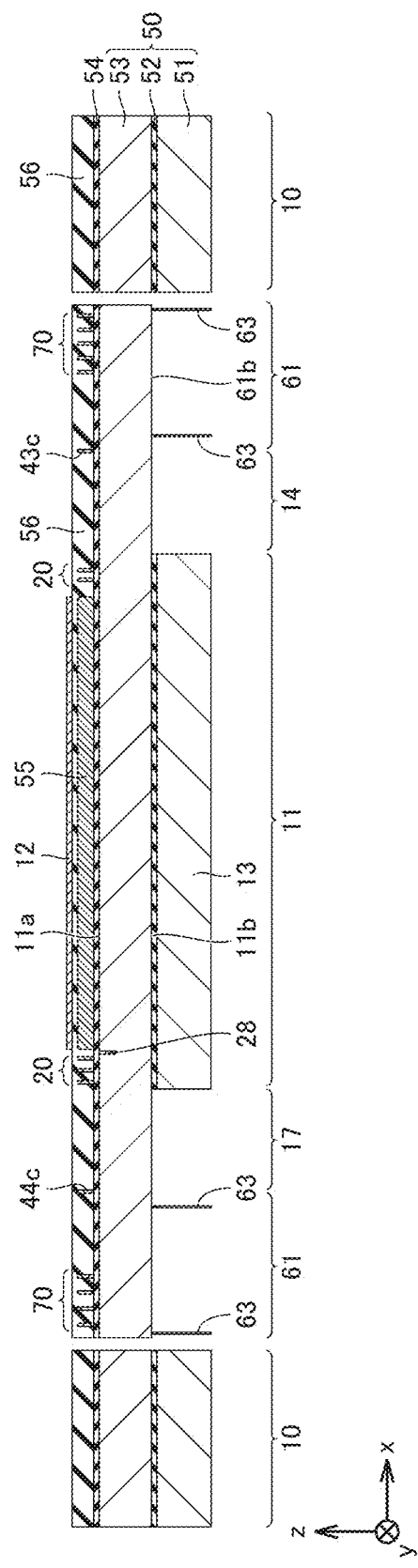
FIG. 31 is a schematic cross-sectional view taken along a line XXXI-XXXI illustrated in FIG. 26 for illustrating the MEMS mirror device according to the third embodiment.
Figure 32:
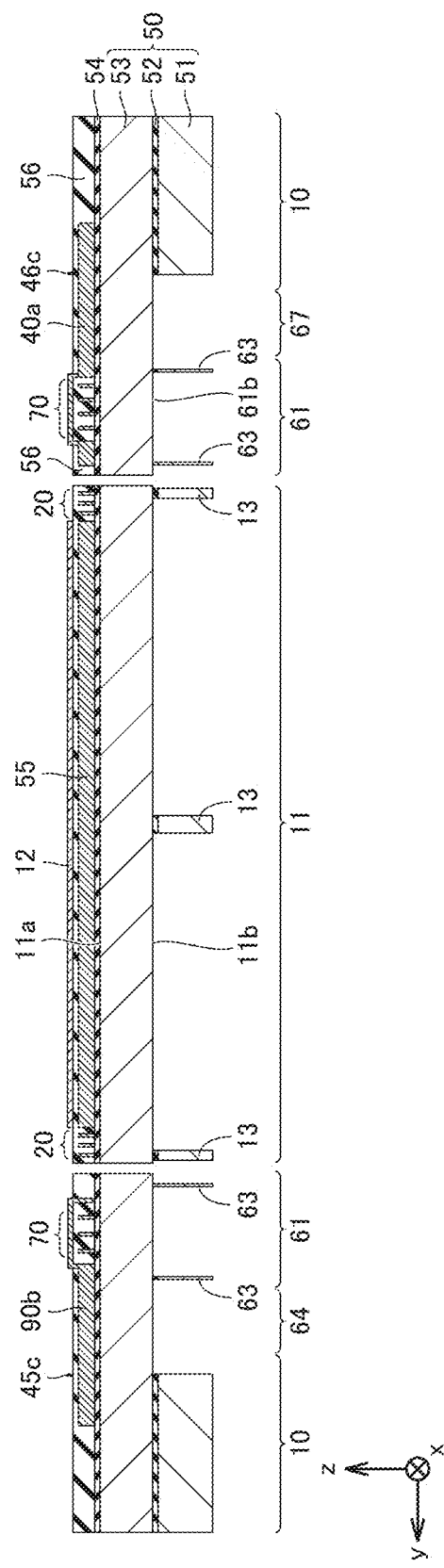
FIG. 32 is a schematic cross-sectional view taken along a line XXXII-XXXII illustrated in FIG. 26 for illustrating the MEMS mirror device according to the third embodiment.
Figure 33:
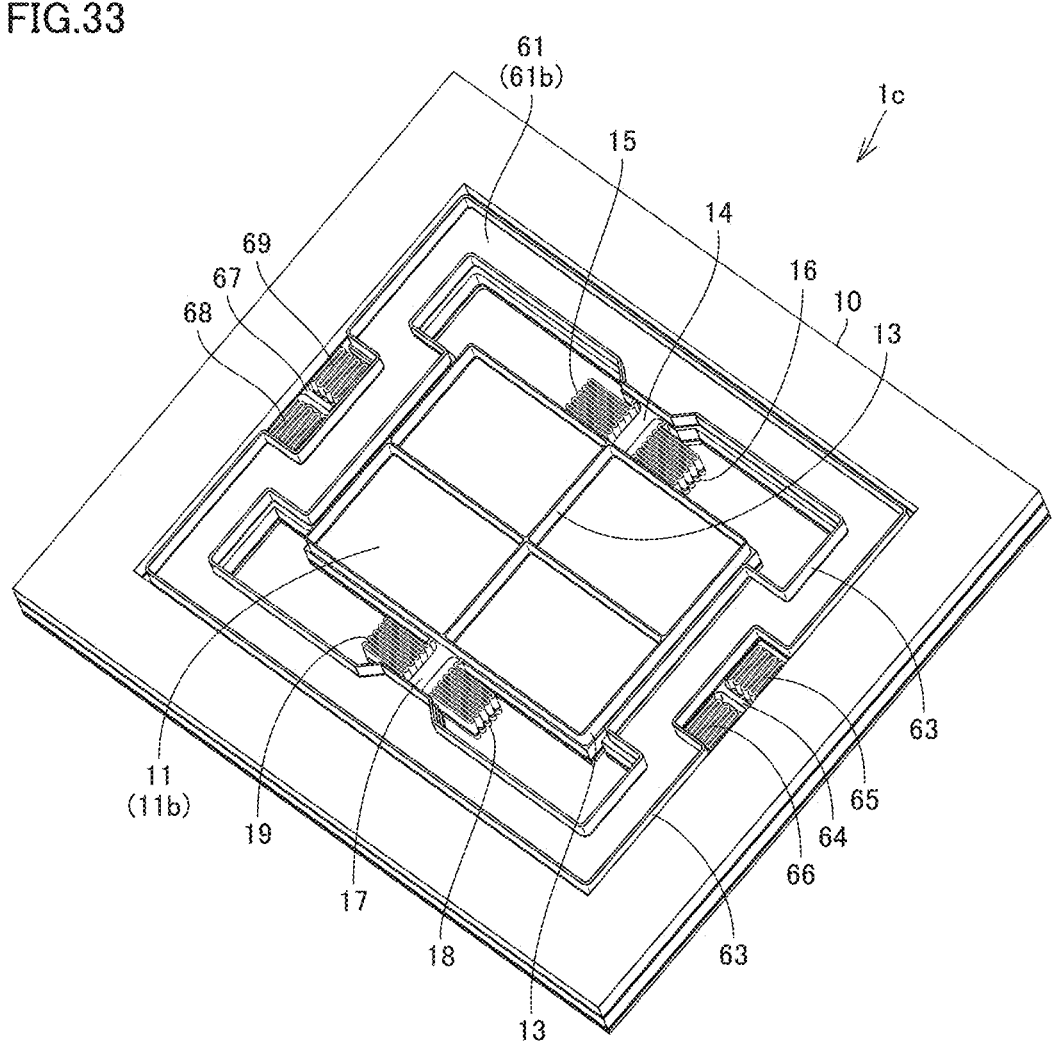
FIG. 33 is a schematic rear perspective view illustrating the MEMS mirror device according to the third embodiment.

The movable frame 61 is connected to the twist beams 14 and 17. The movable plate 11 is rotatably coupled to the movable frame 61. The movable frame 61 is connected to the twist beams 64 and 67. The movable frame 61 is rotatably coupled to the fixed member 10. With reference to FIGS. 31 and 32, the movable frame 61 includes, for example, a Si layer 53.

With reference to FIGS. 31 and 32, the ribs 63 are formed on the rear surface 61b of the movable frame 61. The ribs 63 increase the rigidity of the movable frame 61 so as to prevent the movable frame 61 from being distorted when the movable frame 61 is rotated about the twist beams 64 and 67. Each rib 63 includes, for example, a Si support layer 51 and an insulating layer 52.

Figure 26:
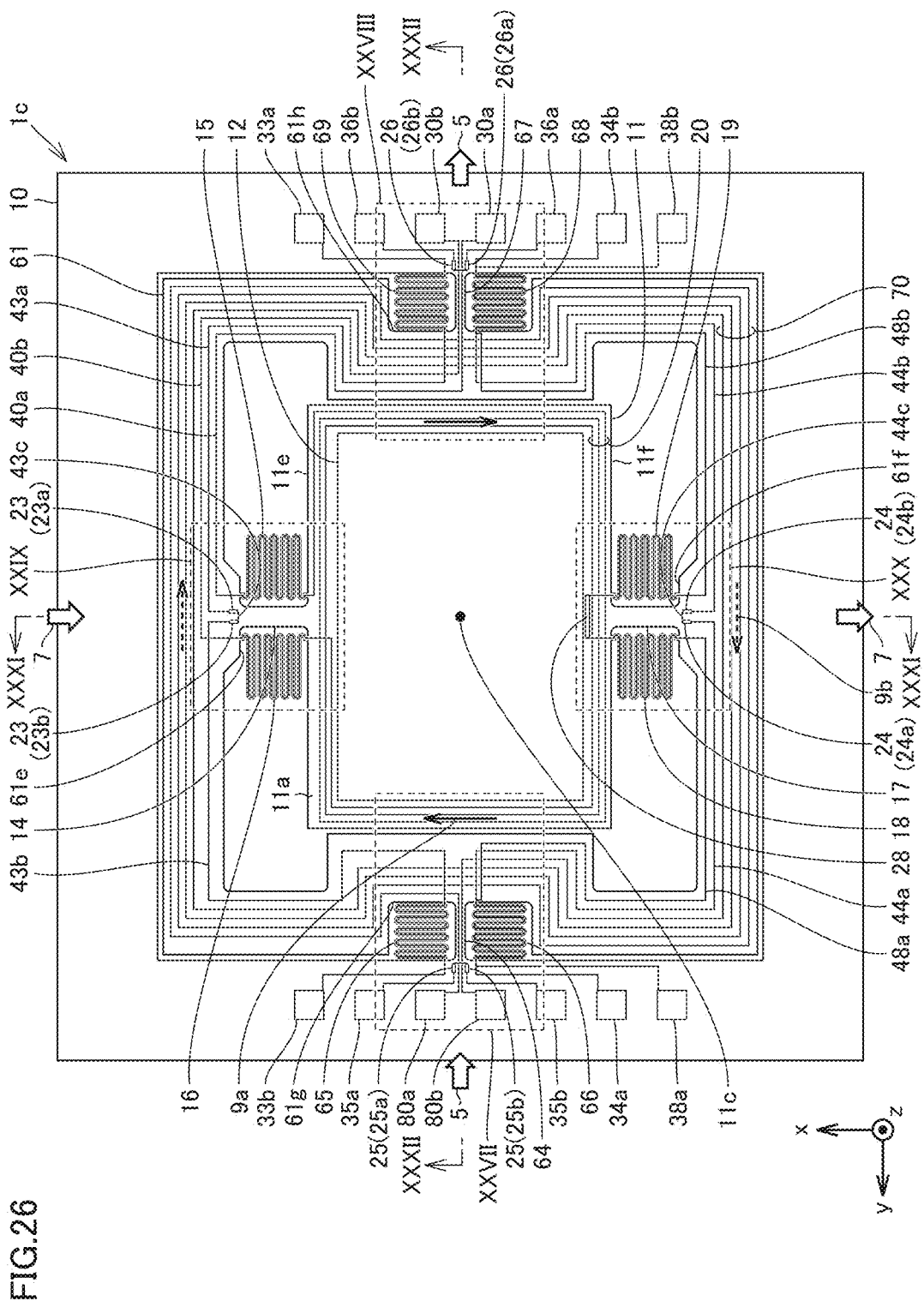
FIG. 26 is a schematic front view illustrating a MEMS mirror device according to the third embodiment.
Figure 29:
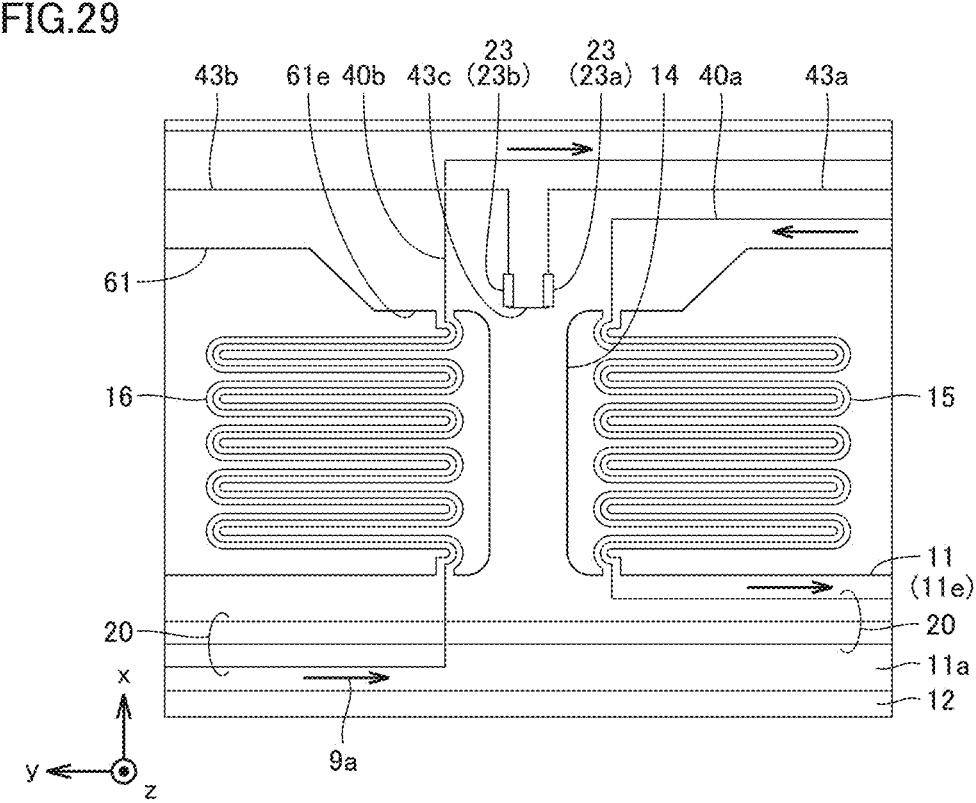
FIG. 29 is a schematic enlarged front view illustrating a region XXIX illustrated in FIG. 26 of the MEMS mirror device according to the third embodiment and a schematic enlarged front view illustrating a region XXIX illustrated in FIG. 35 of the MEMS mirror device according to the fourth embodiment.
Figure 30:
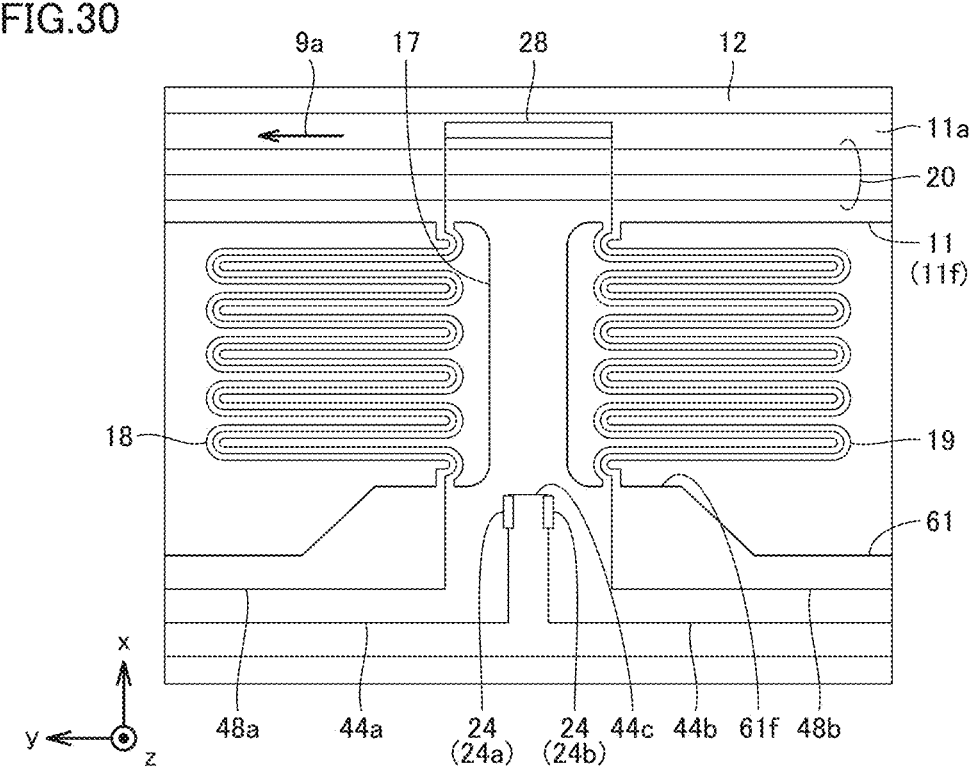
FIG. 30 is a schematic enlarged front view illustrating a region XXX illustrated in FIG. 26 of the MEMS mirror device according to the third embodiment and a schematic enlarged front view illustrating a region XXX illustrated in FIG. 35 of the MEMS mirror device according to the fourth embodiment.

With reference to FIGS. 26, 29 and 30, the twist beams 14 and 17 are connected to the movable plate 11. The twist beams 14 and 17 are connected to the movable frame 61.

Figure 27:
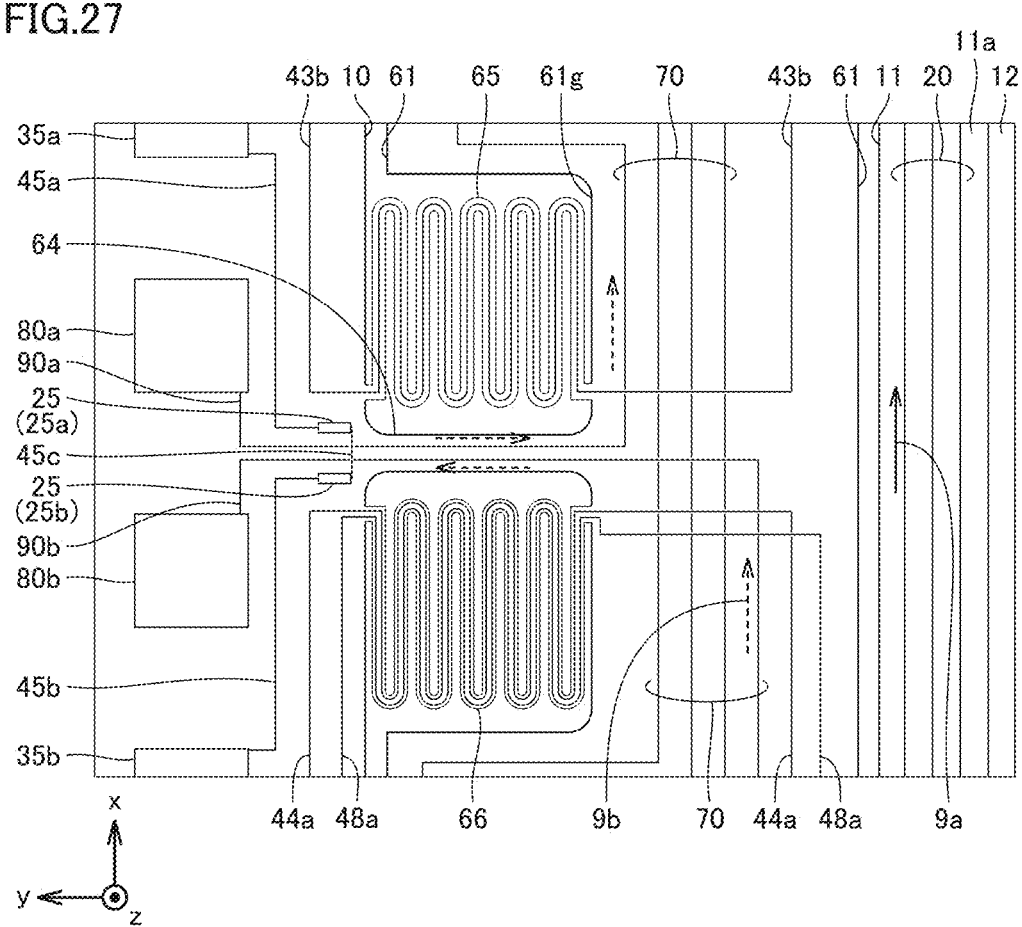
FIG. 27 is a schematic enlarged front view illustrating a region XXVII illustrated in FIG. 26 of the MEMS mirror device according to the third embodiment.
Figure 28:
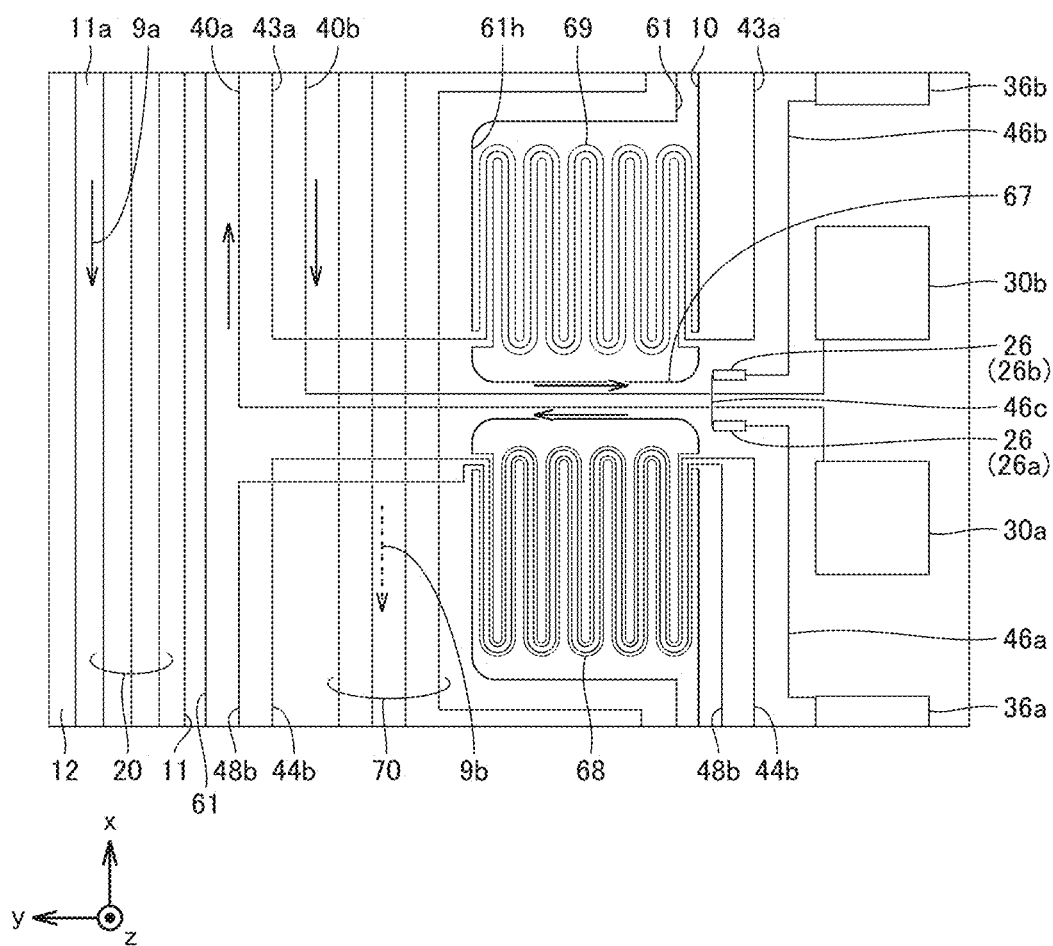
FIG. 28 is a schematic enlarged front view illustrating a region XXVIII illustrated in FIG. 26 of the MEMS mirror device according to the third embodiment.
Figure 34:
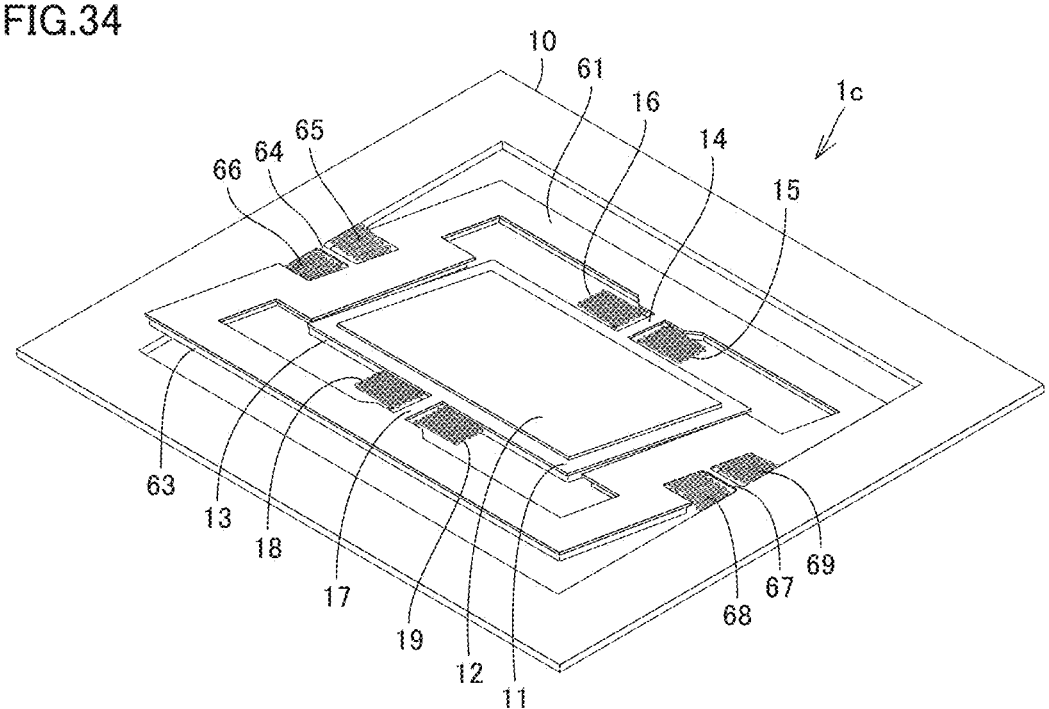
FIG. 34 is a schematic front perspective view illustrating the MEMS mirror device according to the third embodiment in an operating state.

With reference to FIGS. 26 to 28, the twist beams 64 and 67 are connected to the movable frame 61. The twist beams 64 and 67 are connected to the fixed member 10. The longitudinal direction of the twist beams 64 and 67 is in the second direction (y direction). As illustrated in. FIG. 34, the movable frame 61 is rotatable about the twist beams 64 and 67 (y axis). With reference to FIG. 32, the twist beams 64 and 67 include a Si layer 53. The insulating layer 54 and the insulating layer 56 may be formed on the twist beams 64 and 67.

With reference to FIGS. 26, 29 and 30, the meander beams 15, 16, 18 and 19 are connected to the movable plate 11 and the movable frame 61, The meander beams 15 and 16 and the twist beam 14 are connected to the same surface (specifically, the first inner side surface 61g) of the movable frame 61. The meander beams 15 and 16 are arranged along the twist beam 14. The meander beams 18 and 19 and the twist beam 17 are connected to the same surface (specifically, the second inner side surface 61h) of the movable frame 61. The meander beams 18 and 19 are arranged along the twist beam 17.

With reference to FIGS. 26 to 28, the meander beams 65, 66, 68 and 69 are connected to the fixed member 10 and the movable frame 61. The meander beams 65 and 66 and the twist beam 64 are connected to the same surface (specifically, the first outer side surface 61e) of the movable frame 61. The meander beams 65 and 66 are arranged along the twist beam 64. The meander beams 68 and 69 and the twist beam 67 are connected to the same surface (specifically, the second outer side surface 61f) of the movable frame 61. The meander beams 68 and 69 are arranged along the twist beam 67.

The meander beams 65, 66, 68 and 69 may be disposed at a position where the stress applied to the meander beams 65, 66, 68 and 69 is low when the movable plate 11 is rotated and the stress applied from the twist beams 64 and 67 to the meander beams 65, 66, 68 and 69 is low when the twist beams 64 and 67 are twisted. The meander beam 65 is disposed on a third side (+x side) of the twist beam 64. The meander beam 66 is disposed on a fourth side (−x side) of the twist beam 64. The fourth side is opposite to the third side. The meander beam 68 is disposed on the fourth side (−x side) of the twist beam 67. The meander beam 69 is disposed on the third side (+x side) of the twist beam 67.

Specifically, in a plan view of the front surface 11a of the movable plate 11, the meander beams 65, 66, 68 and 69 are disposed rotationally symmetrically with respect to the center 11c of the movable plate 11. The meander beams 65 and 66 are disposed on both sides of the twist beam 64 symmetrically with respect to the twist beam 64. The meander beams 68 and 69 are disposed on both sides of the twist beam 67 symmetrically with respect to the twist beam 67.

The folding direction of the meander beams 65, 66, 68 and 69 is in the first direction (x direction). The folding direction of the meander beams 65, 66, 68 and 69 may be in the second direction (y direction). With reference to FIG. 32, the meander beams 65, 66, 68 and 69 include the Si layer 53. The insulating layer 54 and the insulating layer 56 may be formed on the meander beams 65, 66, 68 and 69. The twist beams 64 and 67 may have the same layer structure as the meander beams 65, 66, 68 and 69.

The natural vibration frequency of the meander beams 65, 66, 68 and 69 when both ends of the meander beams 65, 66, 68 and 69 are fixed is larger than the resonance frequency of the rotational motion of the movable member about the twist beams 64 and 67, The natural vibration frequency of the meander beams 65, 66, 68 and 69 refers to the natural vibration frequency of the meander beams 65, 66, 68 and 69 in the primary natural vibration mode when bath ends of the meander beams 65, 66, 68 and 69 are fixed. Therefore, the meander beams 65, 66, 68 and 69 smoothly follow the rotational motion of the movable plate 11 about the twist beams 64 and 67 without hindering the rotational motion of the movable plate 11.

The rigidity of the meander beams 65, 66, 68 and 69 is lower than that of the twist beams 64 and 67. The rigidity of the meander beams 65, 66, 68 and 69 may be defined by, for example, the length, the width and the number of meander beams 65, 66, 68 and 69, and the distance between adjacent beam portions of the meander beams 65, 66, 68 and 69.

Therefore, it is possible to reduce the stress generated on the surfaces of the meander beams 65, 66, 68 and 69 lower than the stress generated on the surfaces of the twist beams 64 and 67 when the mirror 12 (the movable plate 11) is rotated to twist the twist beams 64 and 67 and the meander beams 65, 66, 68 and 69. Thereby, it is possible to reduce the stress applied to the wire (for example, aluminum wire) formed on the surface of the meander beam lower than the stress applied to the wire formed on the surface of the twist beam. Accordingly, during the operation of the MEMS mirror device 1c, it is difficult for the wires (for example, the wires 43a, 43b, 44a, 44b, 48a and 48b) to deteriorate or break. Thereby, the reliability of the MEMS mirror device 1c is improved. The optical scanning angle of the MEMS mirror device 1 an be increased.

The MEMS mirror device 1c further includes a second coil 70, strain gauges 25 and 26, terminals 35a, 35b, 36a, 36b, 80a and 80b, and wires 45a, 45b, 46a, 46b, 46c, 90a and 90h.

With reference to FIGS. 26 to 32, the second coil 70 is, for example, a thin-film coil. The second coil 70 is formed of a metal layer such as aluminum, gold, silver, or copper. The second coil 70 is disposed on the movable frame 61. Specifically, the second coil 70 is disposed on the front surface 11a of the movable frame 61 with the insulating layer 54 interposed therebetween. The insulating layer 54 electrically insulates the second coil 70 from the Si layer 53. The second coil 70 may be covered with the insulating layer 56.

With reference to FIGS. 26, 29, and 30, the strain gauges 23 and 24 are disposed, for example, at a portion of the twist beams 14 and 17 that is distal to the movable plate 11. The strain gauges 23 and 24 are disposed, for example, at a portion of the movable frame 61 that is proximal to the twist beams 14 and 17. The strain gauges 23 and 24 may be disposed, for example, at a portion of the twist beams 14 and 17 that is proximal to the movable frame 61.

With reference to FIGS. 26 to 28, the strain gauges 25 and 26 detect a twist angle of the twist beams 64 and 67, i.e., a rotation angle $\theta_y$ of the mirror 12 (the movable plate 11) about the twist beams 64 and 67 (y axis). The strain gauges 25 and 26 are disposed, for example, at a portion of the twist beams 64 and 67 that is distal from the movable frame 61. The strain gauges 25 and 26 are disposed, for example, at a portion of the twist beams 64 and 67 that is proximal to the fixed member 10 or at a portion of the fixed member 10 that is proximal to the twist beams 64 and 67.

The strain gauges 25 and 26 include, for example, a piezoresistive element 25a, 25b, 26a, 26b formed by diffusing impurities into the Si layer 53. When the rotation angle $\theta_y$ of the mirror 12 (the movable plate 11) changes, the stress applied to the piezoresistive element 25a, 25b, 26a, 26b changes. The electric resistance of the piezoresistive element 25a, 25b, 26a, 26b changes in accordance with the change in the stress. The twist angle of the twist beams 64 and 67, i.e., the rotation angle $\theta_y$ of the mirror 12 (the movable plate 11) about the twist beams 64 and 67 (y axis) may be detected from the change in the electric resistance of the piezoresistive element 25a, 25b, 26a, 26b.

The terminals 35a, 35b, 36a, 36b, 80a and 80b are formed on the fixed member 10. The terminals 35a, 35b, 36a, 36b, 80a and 80b may be formed of the same material as the first coil 20, the second coil 70, and the wires 40a, 40b, 43a, 43b, 43c, 44a, 44b, 44e, 45a, 45b, 45c, 46a, 46b, 46c, 48a, 48b, 90a and 90b. The terminals 80a and 80b are provided for the second coil 70. The terminals 35a and 35b are provided for the strain gauge 25. The terminals 36a and 36b are provided for the strain gauge 26.

Each of the wire 40a, 40b, 43a, 43b, 43c, 44a, 44b, 44c, 45a, 45b, 45c, 46a, 46b, 46c, 48a, 48b, 90a and 90b is formed of a metal layer such as aluminum, gold, silver, or copper. Each of the wires 40a, 40b, 43a, 43b, 43c, 44a, 44b, 44c, 45a, 45b, 45c, 46a, 46b, 46c, 48a, 48b, 90a and 90b may be formed of the same material as the first coil 20 and the second coil 70.

The wires 40a and 40b extend from the movable plate 11 to the fixed member 10. Specifically, the wire 40a extends from the first coil 20 to the terminal 30a. The wire 40a is formed on the twist beam 67, the movable frame 61 and the meander beam 15, but is not formed on the twist beam 14. The wire 40a extends on the twist beam 67 in the longitudinal direction of the twist beam 67. The wire 40b extends from the first coil 20 to the terminal 30b. The wire 40b is formed on the twist beam 67, the movable frame 61 and the meander beam 16, but is not formed on the twist beam 14. The wire 40b extends on the twist beam 67 in the longitudinal direction of the twist beam 67.

The wires 48a and 48b extend from the movable plate 11 to the fixed member 10. Specifically, the wire 48a extends from the temperature sensor 28 to the terminal 38a. The wire 48a is formed on the meander beams 18 and 66 and the movable frame 61, but is not formed on the twist beams 17 and 64. The wire 48b extends from the temperature sensor 28 to the terminal 38b. The wire 48b is formed on the meander beams 19 and 68 and the movable frame 61, but is not formed on the twist beams 17 and 67.

The wires 90a and 90b extend from the movable frame 61 to the fixed member 10. Specifically, the wire 90a extends from the second coil 70 to the terminal 80a. The wire 90a is formed on the twist beam 64 and the movable frame 61. The wire 90a extends on the twist beam 64 in the longitudinal direction of the twist beam 64. The wire 90b extends from the second coil 70 to the terminal 80h. The wire 90b is formed on the twist beam 64 and the movable frame 61, The wire 90b extends on the twist beam 64 in the longitudinal direction of the twist beam 64.

The wires 43a and 43b extend from the strain gauge 23 to the fixed member 10. Specifically, the wire 43a extends from the piezoresistive element 23a to the terminal 33a. The wire 43a is formed on the meander beam 69 and the movable frame 61, but is not formed on the twist beam 67. The wire 43b extends from the piezoresistive element 23b to the terminal 33b. The wire 43b is formed on the meander beam 65 and the movable frame 61, but is not formed on the twist beam 64. The wire 43c is connected to the piezoresistive element 23a and the piezoresistive element 23b. The wire 43c is formed on the fixed member 10. When the strain gauge 23 is disposed on the twist beam 14, the wire 43c may be formed on the twist beam 14. The wire 43c extends mainly along the width direction (the second direction (y direction)) of the twist beam 14.

The wires 44a and 44b extend from the strain gauge 24 to the fixed member 10. Specifically, the wire 44a extends from the piezoresistive element 24a to the terminal 34a. The wire 44a is formed on the meander beam 66 and the movable frame 61, but is not formed on the twist beam 64. The wire 44h extends from the piezoresistive element 24b to the terminal 34b. The wire 44b is formed on the meander beam 68 and the movable frame 61, but is not formed on the twist beam 67. The wire 44c is connected to the piezoresistive element 24a and the piezoresistive element 24b. The wire 44c is formed on the fixed member 10. When the strain gauge 24 is disposed on the twist beam 17, the wire 44c may be formed on the twist beam 17. The wire 44c extends mainly along the width direction (the second direction (y direction)) of the twist beam 17.

The wires 45a and 45b extend from the strain gauge 25 to the terminals 35a and 35b. Specifically, the wire 45a extends from the piezoresistive element 25a to the terminal 35a. The wire 45a is formed on the fixed member 10. The wire 45b extends from the piezoresistive element 25b to the terminal 35b. The wire 45b is formed on the fixed member 10. The wire 45c is connected to the piezoresistive element 25a and the piezoresistive element 25b. The wire 45c is formed on the fixed member 10. When the strain gauge 25 is disposed on the twist beam 64, the wire 45c may be formed on the twist beam 64. The wire 45c extends mainly along the width direction (the first direction (x direction)) of the twist beam 64.

The wires 46a and 46b extend from the strain gauge 26 to the terminals 36a and 36b. Specifically, the wire 46a extends from the piezoresistive element 26a to the terminal 36a. The wire 46a is formed on the fixed member 10. The wire 46b extends from the piezoresistive element 26b to the terminal 36b. The wire 46b is formed on the fixed member 10. The wire 46c is connected to the piezoresistive element 26a and the piezoresistive element 26b. The wire 46c is formed on the fixed member 10. When the strain gauge 26 is formed on the twist beam 67, the wire 46c may be formed on the twist beam 67. The wire 46c extends mainly along the width direction (the first direction (x direction)) of the twist beam 67.

A plurality of wires (for example, two wires) are formed on each of the meander beams 66 and 68. The wires 48a and 48b extending from the movable plate 11 to the fixed member 10 are formed on the meander beams 66 and 68, but are not formed on the twist beams 14 and 17, 64 and 67. The wires 40a and 40b extending from the movable plate 11 to the fixed member 10 are formed on the meander beams 15 and 16, but are not formed on the twist beams 14 and 17, and 64.

With reference to FIGS. 26 and 28, the wire 40a includes a bridge wire. The bridge wire of the wire 40a straddles the second coil 70. The insulating layer 56 is formed between the bridge wire of the wire 40a and the second coil 70. The wire 40a and the second coil 70 are electrically insulated from each other by the insulating layer 56.

With reference to FIGS. 26, 28 and 29, the wire 40b includes a first bridge wire and a second bridge wire. The first bridge wire of the wire 40b straddles the first coil 20. The insulating layer 56 is formed between the first bridge wire of the wire 40b and the first coil 20. The wire 40b and the first coil 20 are electrically insulated from each other by the insulating layer 56. The second bridge wire of the wire 40b straddles the second coil 70. The insulating layer 56 is formed between the second bridge wire of the wire 40b and the second coil 70. The wire 40b and the second coil 70 are electrically insulated from each other by the insulating layer 56.

With reference to FIGS. 26 and 28, the wire 43a includes a bridge wire. The bridge wire of the wire 43a straddles the second coil 70. The insulating layer 56 is formed between the bridge wire of the wire 43a and the second coil 70. The wire 43a and the second coil 70 are electrically insulated from each other by the insulating layer 56.

With reference to FIGS. 26, 27, and 29, the wire 43b includes a first bridge wire and a second bridge wire. The first bridge wire of the wire 43b straddles the second coil 70. The insulating layer 56 is formed between the first bridge wire of the wire 43b and the second coil 70. The wire 43b and the second coil 70 are electrically insulated from each other by the insulating layer 56. The second bridge wire of the wire 43b straddles the wire 40b. The insulating layer 56 is formed between the second bridge wire of the wire 43b and the wire 40b. The wire 43b and the wire 40b are electrically insulated from each other by the insulating layer 56.

With reference to FIGS. 26 and 27, the wire 44a includes a bridge wire. The bridge wire of the wire 44a straddles the second coil 70. The insulating layer 56 is formed between the bridge wire of the wire 44a and the second coil 70. The wire 44a and the second coil 70 are electrically insulated from each other by the insulating layer 56.

With reference to FIGS. 26 and 28, the wire 44b includes a bridge wire. The bridge wire of the wire 44b straddles the second coil 70. The insulating layer 56 is formed between the bridge wire of the wire 44b and the second coil 70. The wire 44b and the second coil 70 are electrically insulated from each other by the insulating layer 56.

With reference to FIGS. 26 and 27, the wire 45c includes a bridge wire. The bridge wire of the wire 45c straddles the wires 90a and 90b. The insulating layer 56 is formed between the bridge wire of the wire 45c and the wires 90a and 90b. The wire 45c and the wires 90a and 90b are electrically insulated from each other by the insulating layer 56.

With reference to FIGS. 26 and 28, the wire 46c includes a bridge wire. The bridge wire of the wire 46c straddles the wires 40a and 40b. The insulating layer 56 is formed between the bridge wire of the wire 46c and the wires 40a and 40b. The wire 46c and the wires 40a and 40b are electrically insulated from each other by the insulating layer 56.

With reference to FIGS. 26, 27, and 30, the wire 48a includes a first bridge wire and a second bridge wire. The first bridge wire of the wire 48a straddles the first coil 20. The insulating layer 56 is formed between the first bridge wire of the wire 48a and the first coil 20. The wire 48a and the first coil 20 are electrically insulated from each other by the insulating layer 56. The second bridge wire of the wire 48a straddles the second coil 70. The insulating layer 56 is formed between the second bridge wire of the wire 48a and the second coil 70. The wire 48a and the second coil 70 are electrically insulated from each other by the insulating layer 56.

With reference to FIGS. 26, 28, and 30, the wire 48b includes a first bridge wire and a second bridge wire. The first bridge wire of the wire 48b straddles the first coil 20. The insulating layer 56 is formed between the first bridge wire of the wire 48b and the first coil 20. The wire 48b and the first coil 20 are electrically insulated from each other by the insulating layer 56. The second bridge wire of the wire 48b straddles the second coil 70. The insulating layer 56 is formed between the second bridge wire of the wire 48h and the second coil 70. The wire 48b and the second coil 70 are electrically insulated from each other by the insulating layer 56.

With reference to FIGS. 26 and 27, the wire 90b includes a bridge wire. The bridge wire of the wire 90b straddles the second coil 70. The insulating layer 56 is formed between the bridge wire of the wire 90b and the second coil 70, The wire 90b and the second coil 70 are electrically insulated from each other by the insulating layer 56.

With reference to FIG. 25, the controller 8 is connected to the MEMS mirror device 1c and controls the MEMS mirror device 1c.

For example, the controller 8 adjusts at least one of a first amplitude, a first frequency or a first phase of the AC current 9a supplied to the first coil 20 and at least one of a second amplitude, a second frequency or a second phase of the AC current 9b supplied to the second coil 70.

For example, when the temperature of the movable member including the movable plate 11 or the like changes, the resonance frequency of the rotational motion of the movable member may change. The controller 8 receives a signal related to the temperature of the movable plate 11 from the temperature sensor 28. The controller 8 changes the first frequency of the AC current 9a supplied to the first coil 20 based on the temperature of the movable plate 11 so that the first frequency of the AC current 9a supplied to the first coil 20 coincides with the resonance frequency of the rotational motion of the movable member about the twist beams 14 and 17. The controller 8 changes the second frequency of the AC current 9b supplied to the second coil 70 based on the temperature of the movable plate 11 so that the second frequency of the AC current 9b supplied to the first coil 20 coincides with the resonance frequency of the rotational motion of the movable member about the twist beams 64 and 67. Thus, the rotation angle of the mirror 12 (the scanning angle of the light reflected by the mirror 12) can be maintained.

The operation of the MEMS mirror device 1c will be described with reference to FIGS. 25, 26, and 34.

As illustrated in FIGS. 25 and 26, the magnetic field generators 4a and 4b apply a magnetic field 5 to the MEMS mirror device 1c in the second direction (y direction). The magnetic field generators 6a and 6b apply a magnetic field 5 to the MEMS mirror device 1c in the first direction (x direction). The controller 8 supplies an AC current 9a to the first coil 20 and supplies an AC current 9b to the second coil 70.

The magnetic field 5 and the AC current 9a generate a first electromagnetic force. As illustrated in FIG. 34, the first electromagnetic force swings the mirror 12 (the movable plate 11) about the twist beams 14 and 17. Specifically, the first frequency of the AC current 9a is set to coincide with the resonance frequency of the rotational motion of the movable member about the twist beams 14 and 17. Therefore, it is possible to use a smaller AC current 9a to swing the mirror 12 (the movable plate 11) about the twist beams 14 and 17 at a greater deflection angle and swing the mirror 1 (the movable plate 11) about the twist beams 14 and 17 at a higher speed.

The magnetic field 7 and the AC current 9b generate a second electromagnetic force. As illustrated in FIG. 34, the second electromagnetic force swings the mirror 12 (the movable plate 11) about the twist beams 64 and 67. Specifically, the second frequency of the AC current 9b is set to coincide with the resonance frequency of the rotational motion of the movable member about the twist beams 64 and 67, Therefore, it is possible to use a smaller AC current 9b to swing the mirror 12 (the movable plate 11) about the twist beams 64 and 67 at a greater deflection angle and swing the mirror 12 (the movable plate 11) about the twist beams 64 and 67 at a higher speed. Thus, the MEMS mirror device 1c perform an optical scanning in the first direction (x direction) and the second direction (y direction).

The MEMS mirror device 1c of the present embodiment has the following effects in addition to the effects of the MEMS mirror device 1b of the second embodiment.

The MEMS mirror device 1c of the present embodiment further includes at least one second wire (for example, the wires 43a, 43b, 44a and 44h). The movable member further includes a movable frame 61 connected to at least one first twist beam (for example, the twist beams 14 and 17), at least one second twist beam (for example, the twist beams 64 and 67) connected to the movable frame 61, and at least one second meander beam (for example, the meander beams 65, 66, 68 and 69) connected to the movable frame 61. The longitudinal direction of the at least one second twist beam is in the second direction (y direction) intersecting the first direction. The at least one second meander beam is disposed along the at least one second twist beam. The at least one second wire extends from the movable frame 61 to the fixed member 10. The at least one second wire is formed on the at least one second meander beam.

Thereby, it is possible to reduce the number of wires formed on the at least one second twist beam (for example, the twist beams 64 and 67) and extending along the longitudinal direction of the at least one second twist beam, which makes it possible to reduce the width of the at least one second twist beam. Thereby, the MEMS mirror device 1c can have a larger optical scanning angle.

In the MEMS mirror device 1c of the present embodiment, the natural vibration frequency of the at least one second meander beam (for example, the meander beams 65, 66, 68 and 69) when both ends of the at least one second meander beam are fixed is larger than the resonance frequency of the second rotational motion of the movable member about the at least one second twist beam (for example, the twist beams 64 and 67).

Therefore, the at least one second meander beam (for example, the meander beams 65, 66, 68 and 69) smoothly follows the rotational motion of the movable plate 11 about the at least one second twist beam (for example, the twist beams 64 and 67), Thereby, the MEMS mirror device 1c can perform more stable optical scanning.

In the MEMS mirror device 1c of the present embodiment, the at least one second meander beam (for example, the meander beams 65, 66, 68 and 69) has a lower rigidity than the at least one second twist beam (for example, the twist beams 64 and 67).

Therefore, it is possible to reduce the stress generated on the surface of the at least one second meander beam (for example, the meander beams 65, 66, 68 and 69) lower than the stress generated on the surface of the at least one second twist beam (for example, the twist beams 64 and 67) when the mirror 12 (the movable plate 11) is rotated to twist the at least one second twist beam and the at least one second meander beam. Thereby, it is possible to reduce the stress applied to the wires formed on the surface of the at least one second meander beans lower than the stress applied to the wires formed on the surface of the at least one second twist beam. Accordingly, during the operation of the MEMS mirror device 1c, it is difficult for the at least one second wire (for example, the wires 43a, 43b, 44a and 44b) to deteriorate or break. Thereby, the reliability of the MEMS mirror device 1c is improved.

In the MEMS mirror device 1c of the present embodiment, the at least one second meander beam (for example, the meander beams 65, 66, 68 and 69) includes a plurality of second meander beams (for example, the meander beams 65, 66, 68 and 69). The plurality of second meander beams are disposed rotationally symmetrically with respect to the center 11c of the movable plate 11 in a plan view of the front surface 11a of the movable plate 11.

Therefore, it is possible to rotate the mirror 12 (the movable plate 11) symmetrically about the at least one second twist beam (for example, the twist beams 64 and 67), which make it possible for the MEMS mirror device 1c to perform an optical scanning symmetrically. Further, since the stress applied to the movable plate 11 is symmetrical, it is possible to reduce or eliminate the surface strain of the mirror 12 (the movable plate 11).

In the MEMS mirror device 1c of the present embodiment, the at least one second wire (for example, the wires 43a, 43b, 44a and 44b) includes a plurality of second wires (for example, the wires 43a, 43h, 44a and 44b). The plurality of second wires are formed on the at least one second meander beam (for example, the meander beams 65, 66, 68 and 69).

Since more wires can be formed on the at least one second meander beam (for example, the meander beams 65, 66, 68 and 69), it is possible to reduce the number of wires formed on at least one second twist beam (for example, the twist beams 64 and 67), Therefore, the MEMS mirror device 1c can have a larger optical scanning angle.

In the MEMS mirror device 1c of the present embodiment, the at least one second twist beam (for example, the twist beams 64 and 67) has the same layer structure as the at least one second meander beam (for example, the meander beams 65, 66, 68 and 69).

Therefore, it is possible to manufacture the at least one second twist beam (for example, the twist beams 64 and 67) and the at least one second meander beam (for example, the meander beams 65, 66, 68 and 69) by the same process, which makes it possible to reduce the manufacturing cost of the MEMS mirror device 1c.

Fourth Embodiment

With reference to FIG. 25, an optical scanning device 2d according to a fourth embodiment will be described. The optical scanning device 2d of the present embodiment includes a MEMS mirror device 1d of the present embodiment instead of the MEMS mirror device 1c of the third embodiment. With reference to FIGS. 29, 30, and 35 to 37, the MEMS mirror device 1d of the present embodiment has a configuration similar to the MEMS mirror device 1c of the third embodiment, but is different from that mainly in the following points.

The wire 40a is formed on the meander beams 15 and 69 and the movable frame 61, but is not formed on the twist beams 14 and 67. The wire 40b is formed on the meander beams 16 and 69 and the movable frame 61, but is not formed on the twist beams 14 and 67.

The wires 90a and 90b are formed on the meander beam 65 and the movable frame 61, but are not formed on the twist beam 64. The wire 43a is formed on the meander beam 68, but is not formed on the twist beam 67. The wire 43b is formed on the meander beam 66, but is not formed on the twist beam 64.

A plurality of wires are formed on each of the meander beams 65, 66, 68 and 69. Specifically, the wires 90a and 90b are formed on the meander beam 65. The wires 43b, 44a and 48a are formed on the meander beam 66. The wires 43a, 44b and 48b are formed on the meander beam 68. The wires 40a and 40b are formed on the meander beam 69. All the wires 40a, 40b, 48a and 48b extending from the movable plate 11 to the fixed member 10 are formed on the meander beams 15, 16, 18, 19, 66, 68 and 69, but are not formed on the twist beams 14, 17, 64 and 67. All the wires 40a, 40b, 43a, 43b, 44a, 44b, 48a, 48b, 90a and 90b extending from the movable frame 61 to the fixed member 10 are formed on the meander beams 65, 66, 68 and 69, but are not formed on the twist beams 64 and 67.

Figure 35:
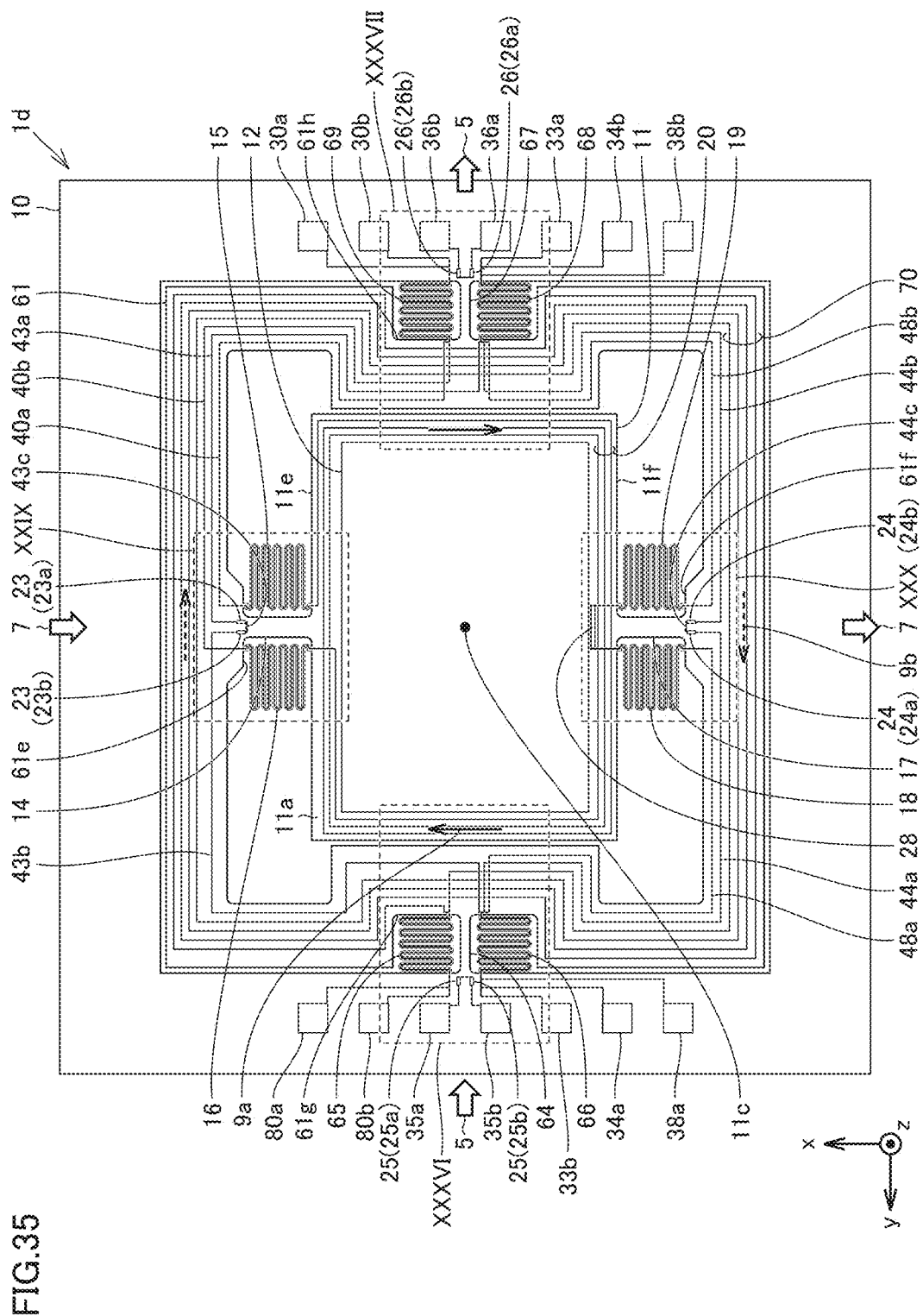
FIG. 35 is a schematic front view illustrating a MEMS mirror device according to the fourth embodiment.
Figure 37:
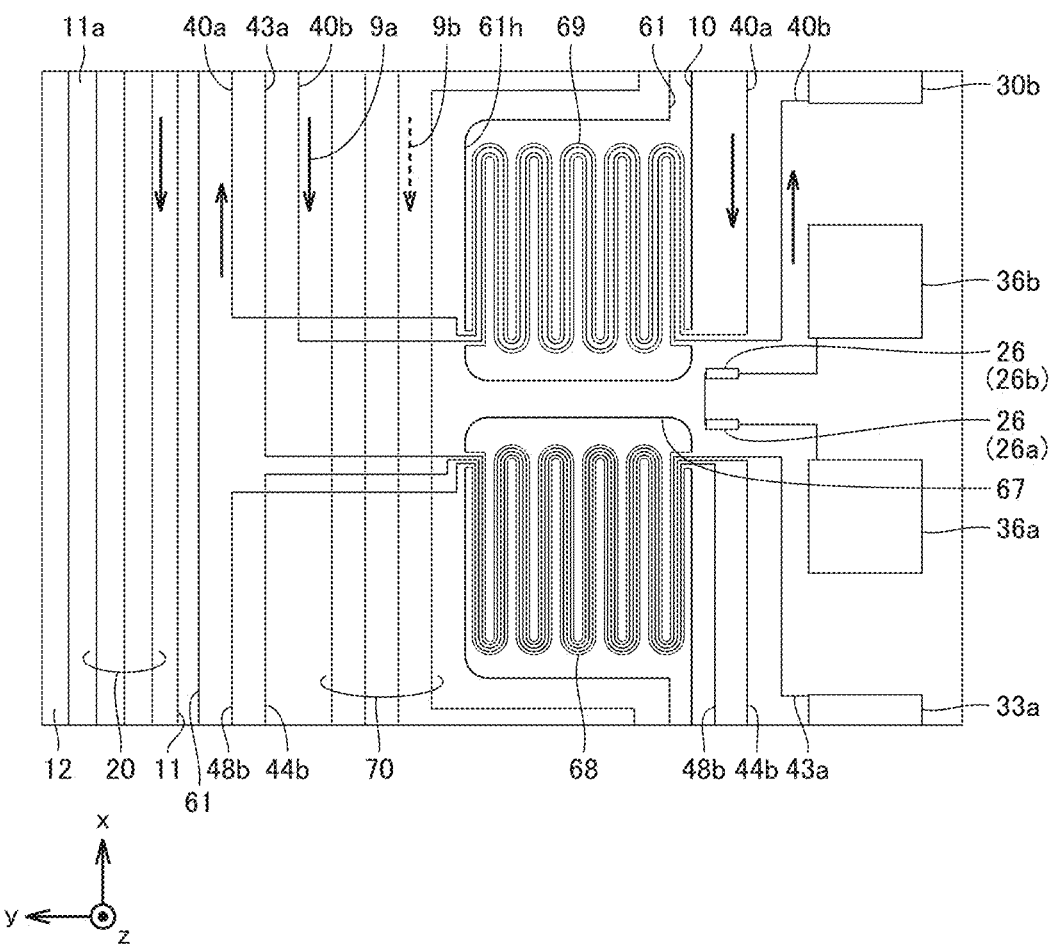
FIG. 37 is a schematic enlarged front view illustrating a region XXXVII illustrated in FIG. 35 of the MEMS mirror device according to the fourth embodiment.

With reference to FIGS. 35 and 37, the wire 40a includes a bridge wire. The bridge wire of the wire 40a straddles the second coil 70. The wire 40a and the second coil 70 are electrically insulated from each other.

With reference to FIGS. 29, 35 and 37, the wire 40b includes a first bridge wire and a second bridge wire. The first bridge wire of the wire 40b straddles the first coil 20. The wire 40b and the first coil 20 are electrically insulated from each other. The second bridge wire of the wire 40b straddles the second coil 70. The wire 40b and the second coil 70 are electrically insulated from each other.

Figure 36:
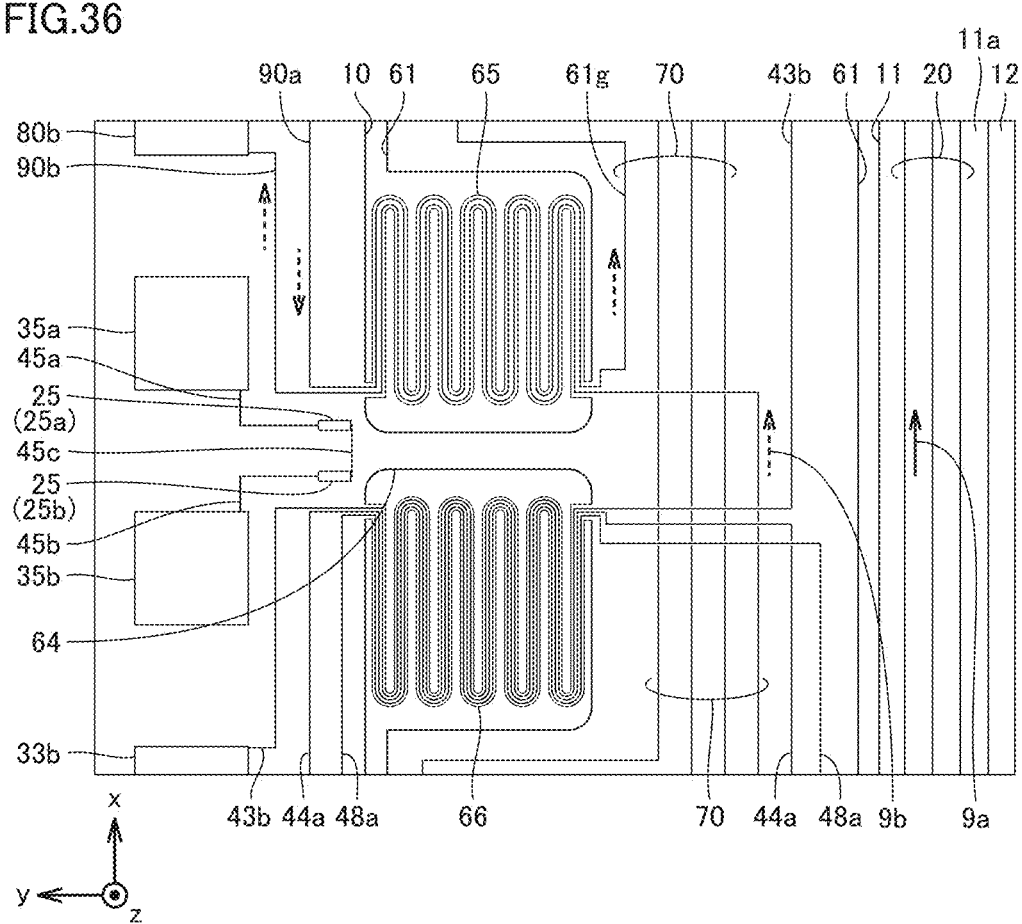
FIG. 36 is a schematic enlarged front view illustrating a region XXXVI illustrated in FIG. 35 of the MEMS mirror device according to the fourth embodiment.

With reference to FIGS. 35 and 37, the wire 43a includes a bridge wire. The bridge wire of the wire 43a straddles the second coil 70. The wire 43a and the second coil 70 are electrically insulated from each other. With reference to FIGS. 30, 35, and 36, the wire 43b includes a first bridge wire and a second bridge wire. The first bridge wire of the wire 43b straddles the second coil 70. The wire 43b and the second coil 70 are electrically insulated from each other. The second bridge wire of the wire 43b straddles the wire 40b. The wire 43b and the wire 40b are electrically insulated from each other.

With reference to FIGS. 35 and 36, the wire 44a includes a bridge wire. The bridge wire of the wire 44a straddles the second coil 70. The wire 44a and the second coil 70 are electrically insulated from each other. With reference to FIGS. 35 and 37, the wire 44b includes a bridge wire. The bridge wire of the wire 44b straddles the second coil 70. The wire 44b and the second coil 70 are electrically insulated from each other.

With reference to FIGS. 35 and 36, the wire 45c does not include a bridge wire. With reference to FIGS. 35 and 37, the wire 46c does not include abridge wire.

With reference to FIGS. 30, 35, and 36, the wire 48a includes a first bridge wire and a second bridge wire. The first bridge wire of the wire 48a straddles the first coil 20. The wire 48a and the first coil 20 are electrically insulated from each other. The second bridge wire of the wire 48a straddles the second coil 70. The wire 48a and the second coil 70 are electrically insulated from each other. With reference to FIGS. 30, 35, and 37, the wire 48b includes a first bridge wire and a second bridge wire. The first bridge wire of the wire 48b straddles the first coil 20. The wire 48b and the first coil 20 are electrically insulated from each other. The second bridge wire of the wire 48b straddles the second coil 70. The wire 48b and the second coil 70 are electrically insulated from each other.

With reference to FIGS. 35 and 36, the wire 910 includes a bridge wire. The bridge wire of the wire 90b straddles the second coil 70. The wire 90b and the second coil 70 are electrically insulated from each other.

The MEMS mirror device 1d of the present embodiment has the following effects similar to those of the MEMS mirror device 1c of the third embodiment.

The MEMS mirror device 1d of the present embodiment further includes at least one second wire (for example, the wires 43a, 43b, 44a, 44b, 90a and 90b). The movable member further includes a movable frame 61 connected to at least one first twist beam (for example, the twist beams 14 and 17), at least one second twist beam (for example, the twist beams 64 and 67) connected to the movable frame 61, and at least one second meander beam (for example, the meander beams 65, 66, 68 and 69) connected to the movable frame 61. The longitudinal direction of the at least one second twist beam is in the second direction (y direction) intersecting the first direction. The at least one second meander beam is disposed along the at least one second twist beam. The at least one second wire extends from the movable frame 61 to the fixed member 10. The at least one second wire is formed on the at least one second meander beam.

Therefore, it is possible to reduce the number of wires formed on the at least one second twist beam (for example, the twist beams 64 and 67) and extending along the longitudinal direction of the at least one second twist beam, which makes it possible to reduce the width of the at least one second twist beam. Therefore, the MEMS mirror device 1*d* can have a larger optical scanning angle.

The MEMS mirror device 1*d* of the present embodiment further includes a second coil 70 disposed on the movable frame 61. The at least one second wire (for example, the wires 43*a*, 43*b*, 44*a*, 44*b*, 90*a* and 90*b*) includes a second coil wire (for example, the wires 90*a* and 90*b*) connected to the second coil 70.

Therefore, it is possible to reduce the number of second coil wires (tor example, the wires 90*a* and 90*b*) formed on the at least one second twist beam (for example, the twist beams 64 and 67) and extending along the longitudinal direction of the at least one second twist beam, which makes it possible to reduce the width of the at least one second twist beam. Therefore, the MEMS mirror device 1*d* can have a larger optical scanning angle.

In the MEMS mirror device 1*d* of the present embodiment, all the wires (For example, the wires 40*a*, 40*b*, 43*a*, 43*b*, 44*a*, 44*b*, 48*a*, 48*b*, 90*a* and 90*b*) including the at least one second wire (for example, the wires 43*a*, 43*b*, 44*a*, 44*b*, 90*a* and 90*b*) and extending from the movable frame 61 to the fixed member 10 are formed on the at least one second meander beam (for example, the meander beams 65, 66, 68 and 69).

Therefore, it is possible to prevent the wires from being formed on the at least one second twist beam (for example, the twist beams 64 and 67) and extending along the longitudinal direction of the at least one second twist beam, which makes it possible to reduce the width of the at least one second twist beam. Therefore, the MEMS mirror device 1*d* can have a larger optical scanning angle.

Fifth Embodiment

Figure 38:
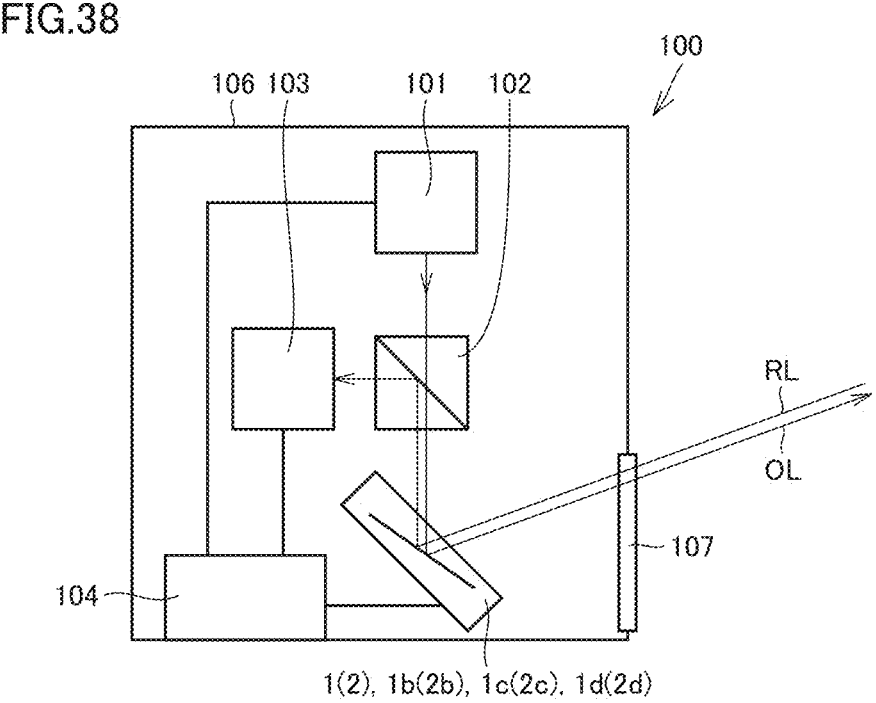
FIG. 38 is a schematic view illustrating a distance measuring apparatus according to a fifth embodiment.

With reference to FIG. 38, a distance measuring apparatus 100 according to a fifth embodiment will be described. The distance measuring apparatus 100 mainly includes any one of the optical scanning devices 2, 2*b*, 2*c* and 2*d* according to the first to fourth embodiments, a light source 101, a photodetector 103, and an arithmetic unit 104, In other words, the distance measuring apparatus 100 includes any one of the MEMS mirror devices 1, 1*b*, 1*c* and 1*d* according to the first to fourth embodiments. The distance measuring apparatus 100 may further include a beam splitter 102. The distance measuring apparatus 100 may further include a housing 106 and a window 107.

The light source 101 emits a light beam to the mirror 1 (see FIGS. 2 to 7, 10, 23, 24, 26 to 32, and 34 to 37.) of any one of the MEMS mirror devices 1, 1*b*, 1*c* and 1*d*, The light source 101 is, for example, a laser light source such as a semiconductor laser. The light source 101 emits a laser beam having a wavelength of 870 nm to 1500 nm, for example.

The beam splitter 102 is disposed between the light source 101 and any one of the MEMS mirror devices 1, 1*b*, 1*c* and 1*d*. The beam splitter 102 may transmit, for example, a light beam emitted from the light source 101, and may reflect a light beam (returning light RL) reflected by an object (not shown).

The light beam emitted from the light source 101 is reflected by the mirror 12 of any one of the MEMS mirror devices 1, 1*b*, 1*c* and 1*d* and emitted from the distance measuring apparatus 100 as an outgoing light OL. The light beam emitted from the light source 101, that is, the outgoing light OL is, for example, pulse light. The outgoing light OL from the distance measuring apparatus 100 is irradiated onto an object (not shown). The beam light reflected by the object returns to the distance measuring apparatus 100 as returning light RE. The returning light RE is reflected by the beam splitter 102 and is incident on the photodetector 103. The photodetector 103 is, for example, a photodiode. The photodetector 103 detects the returning light RE.

The arithmetic unit 104 is communicably connected to the light source 101, any one of the optical scanning devices 2, 2*b*, 2*c* and 2*d*, and the photodetector 103. The arithmetic unit 104 is, for example, a microcomputer including a processor, a RAM (Random Access Memory), and a storage unit such as a ROM (Read Only Memory). As the processor, for example, a CPU (Central Processing Unit) may be adopted. The RAM functions as a working memory for temporarily storing data to be processed by the processor. The storage unit stores, for example, a program to be executed by the processor. In the present embodiment, the arithmetic unit 104 controls the light source 101 and any one of the optical scanning devices 2, 2*b*, 2*c* and 2*d* by causing the processor to execute a program stored in the storage unit. Instead of the microcomputer, a FPGA (Field-Programmable Gate Array) may be adopted as the arithmetic unit 104. The various processes in the arithmetic unit 104 are not limited to being executed by software, but may be executed by dedicated hardware (electronic circuits).

The arithmetic unit 104 controls the light source 101 to control a first timing at which a light beam is emitted from the light source 101. The arithmetic unit 104 controls any one of the optical scanning devices 2, 2*b*, 2*c* and 2*d*. The arithmetic unit 104 calculates an outgoing direction of the outgoing light OL from an inclination angle of the mirror 12 and a position of the light source 101 with respect to the mirror 12. The arithmetic unit 104 receives a signal from the photodetector 103, and recognizes a second timing at which the returning light RL is received by the photodetector 103. The arithmetic unit 104 calculates a distance from the distance measuring apparatus 100 to the object and a direction of the object with respect to the distance measuring apparatus 100 based on the outgoing direction of the outgoing light OL, the first timing at which the light beam (the outgoing light OL) is emitted from the light source 101, and a second timing at which the returning light RI, is received by the photodetector 103, The arithmetic unit 104 generates a distance image of the object including the distance from the distance measuring apparatus 100 to the object and the direction of the object with respect to the distance measuring apparatus 100. The arithmetic unit 104 outputs the distance image of the object to a display unit (not shown) or the like. The display unit displays the distance image of the object.

The housing 106 houses any one of the optical scanning devices 2, 2*b*, 2*c* and 2*d*, the light source 101, and the photodetector 103. The housing 106 may house the beam splitter 102. The housing 106 may house the arithmetic unit 104. The housing 106 is provided with the window 107, The outgoing light OL from any one of the MEMS mirror devices 1, 1*b*, 1*c* and 1*d* passes through the window 107 toward the object. The returning light RL passes through the window 107 and is incident on the distance measuring apparatus 100. Specifically, the returning light RI, passes through the window 107 and is incident on the mirror 12 of any one of the MEMS mirror devices 1, 1*b*, 1*c* and 1*d*.

Modification

Figure 39:
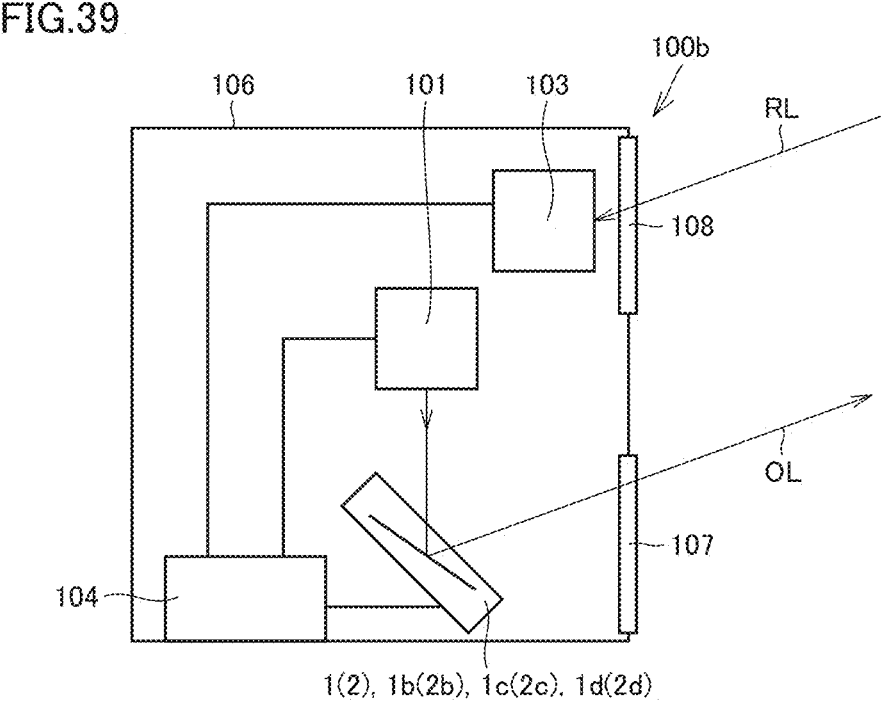
FIG. 39 is a schematic view illustrating a distance measuring apparatus according to a modification of the fifth embodiment.

In the distance measuring apparatus 100 illustrated in FIG. 38, the optical system of the outgoing light OL and the optical system of the returning light RL share an optical system that includes the window 107, any one of the MEMS mirror devices 1, 1b, 1c and 1d, and the beam splitter 102. On the other hand, in a distance measuring apparatus 100b according to a modification of the present embodiment illustrated in FIG. 39, the optical system of the outgoing light OL and the optical system of the returning light RL may be separated from each other.

In the distance measuring apparatus 100b, the housing 106 is provided with a window 108 in addition to the window 107. The returning light RL from the object passes through the window 108 and is incident on the photodetector 103. In the distance measuring apparatus 100b, since the optical system of the outgoing light OL and the optical system of the returning light RL are separated from each other, the beam splitter 102 is omitted. Since the optical system of the outgoing light OL and the optical system of the returning light RL are separated from each other, stray light (e.g., a portion of the light beam from the light source) incident on the photo detector 103 can be reduced. Since the information of the returning light RL is clearly separated from the information of the outgoing light OL, it is possible for the distance measuring apparatus 100b to measure the distance from the distance measuring apparatus 100b to an object with higher accuracy.

The effects of the distance measuring apparatus 100, 100b of the present embodiment will be described.

The distance measuring apparatus 100, 100b of the present embodiment is equipped with one of the MEMS mirror devices 1, 1b, 1c, 1d. Therefore, the distance measuring apparatus 100, 100b has a larger optical scanning angle. Thus, the distance measuring apparatus 100, 100b can measure a distance from the distance measuring apparatus 100, 100b to an object around the distance measuring apparatus 100, 100b over a larger range.

It should be understood that the first to fifth embodiments and the modifications thereof disclosed herein are illustrative and not restrictive in all respects. At least two of the embodiments 1 to 5 and the modifications thereof disclosed herein may be combined unless they are inconsistent to each other. The scope of the present disclosure is defined by the terms of the claims rather than the descriptions in the above, and is intended to include all changes within the meaning and scope equivalent to the claims.

REFERENCE SIGNS LIST 1, 1b, 1c, 1d: MEMS mirror device; 2, 2b, 2c, 2b: optical scanning device; 4a, 4b, 6a, 6b: magnetic field generator; 5, 7: magnetic field; 8: controller; 9a, 9b: AC current; 10: fixed member; 11: movable plate; 11a: front surface; 11b: rear surface; 11c: center; 11e: first side surface; 11f: second side surface; 12: mirror; 13: rib; 14, 17: twist beam; 15, 16, 18, 19: meander beam; 20: first coil; 23, 24, 25, 26: strain gauge; 23a, 23b, 24a, 24b, 25a, 25b, 26a, 26b: piezoresistive element; 28: temperature sensor; 30a, 30b, 33a, 33b, 34a, 34b, 35a, 35b, 36a, 36b, 38a, 38b: terminal; 40a, 40b, 43a, 43b, 43c, 44a, 44b, 44c, 45a, 45b, 45c, 46a, 46b, 46c, 48a, 48b: wire; 50: SOI support layer; 51: Si support layer; 52, 54, 56: insulating layer; 53: Si layer; 55: metal layer; 61: movable frame; 61b: rear surface; 61e: first outer side surface; 61f: second outer side surface; 61g: first inner side surface; 61h: second inner side surface; 63: rib; 64, 67: twist beam; 65, 66, 68, 69: meander beam; 70: second coil; 80a, 80b: terminal; 90a, 90b: wire; 100, 100b: distance measuring apparatus; 101: light source; 102: beam splitter; 103: photodetector; 104: arithmetic unit; 106: housing; 107, 108: window

The invention claimed is:

1. A MEMS mirror device comprising:
a fixed member;
a movable member rotatably coupled to the fixed member;
a mirror; and
at least one first wire,
the movable member including:
    a movable plate having a front surface;
    at least one first twist beam connected to the movable plate and having a longitudinal direction in a first direction; and
    at least one first meander beam connected to the movable plate and disposed along the at least one first twist beam,
the mirror being formed on the front surface of the movable plate,
the at least one first wire extending from the movable plate to the fixed member, and
the at least one first wire being formed on the at least one first meander beam.

2. The MEMS mirror device according to claim 1, wherein
a natural vibration frequency of the at least one first meander beam when both ends of the at least one first meander beam are fixed is larger than a resonance frequency of a first rotational motion of the movable member about the at least one first twist beam.

3. The MEMS mirror device according to claim 1, wherein
the at least one first meander beam has a lower rigidity than the at least one first twist beam.

4. The MEMS mirror device according to claim 1, wherein
the at least one first meander beam is a plurality of first meander beams, and
the plurality of first meander beams are disposed rotationally symmetrically with respect to a center of the movable plate in a plan view of the front surface of the movable plate.

5. The MEMS mirror device according to claim 1, wherein
the at least one first wire is a plurality of first wires, and
the plurality of first wires are formed on the at least one first meander beam.

6. The MEMS mirror device according to claim 1, wherein
the at least one first twist beam has the same layer structure as the at least one first meander beam.

7. The MEMS mirror device according to claim 1, further comprising:
a first coil disposed on the movable plate,
wherein the at least one first wire includes a first coil wire connected to the first coil.

8. The MEMS mirror device according to claim 1, further comprising:
a temperature sensor disposed on the movable plate,
wherein the at least one first wire includes a temperature sensor wire connected to the temperature sensor.

9. The MEMS mirror device according to claim 1, further comprising:
at least one second wire,
wherein the movable member further includes:

a movable frame connected to the at least one first twist beam;

at least one second twist beam connected to the movable frame and having a longitudinal direction in a second direction intersecting the first direction; and at least one second meander beam connected to the movable frame and disposed along the at least one second twist beam, the at least one second wire extends from the movable frame to the fixed member, and the at least one second wire is formed on the at least one second meander beam.

10. The MEMS mirror device according to claim 9, wherein a natural vibration frequency of the at least one second meander beam when both ends of the at least one second meander beam are fixed is larger than a resonance frequency of a second rotational motion of the movable member about the at least one second twist beam.

11. The MEMS mirror device according to claim 9, wherein the at least one second meander beam has a lower rigidity than the at least one second twist beam.

12. The MEMS mirror device according to claim 9, wherein the at least one second meander beam is a plurality of second meander beams, and the plurality of second meander beams are disposed rotationally symmetrically with respect to a center of the movable plate in a plan view of the front surface of the movable plate.

13. The MEMS mirror device according to claim 9, wherein the at least one second wire is a plurality of second wires, and the plurality of second wires are formed on the at least one second meander beam.

14. The MEMS mirror device according to claim 9, wherein the at least one second twist beam has the same layer structure as the at least one second meander beam.

15. The MEMS mirror device according to claim 9, further comprising:

a second coil disposed on the movable frame, wherein the at least one second wire includes a second coil wire connected to the second coil.

16. The MEMS mirror device according to claim 1, wherein all wires including the at least one first wire and extending from the movable plate to the fixed member are formed on the at least one first meander beam.

17. The MEMS mirror device according to claim 9, wherein all wires including at least one second wire and extending from the movable frame to the fixed member are formed on the at least one second meander beam.

18. A distance measuring apparatus comprising the MEMS mirror device according to claim 1.

* * * * *